(12) United States Patent
Nishimori et al.

(10) Patent No.: US 9,121,570 B2
(45) Date of Patent: Sep. 1, 2015

(54) ILLUMINATION LIGHT GENERATION APPARATUS

(71) Applicants: Takehiro Nishimori, Kanagawa (JP); Kazuhiro Fujita, Tokyo (JP); Toshiharu Murai, Kanagawa (JP); Ikuo Maeda, Kanagawa (JP); Tatsuya Takahashi, Tokyo (JP)

(72) Inventors: Takehiro Nishimori, Kanagawa (JP); Kazuhiro Fujita, Tokyo (JP); Toshiharu Murai, Kanagawa (JP); Ikuo Maeda, Kanagawa (JP); Tatsuya Takahashi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 116 days.

(21) Appl. No.: 13/960,170

(22) Filed: Aug. 6, 2013

(65) Prior Publication Data

US 2014/0049755 A1   Feb. 20, 2014

(30) Foreign Application Priority Data

Aug. 16, 2012  (JP) ................................. 2012-180639
Jun. 7, 2013   (JP) ................................. 2013-120878

(51) Int. Cl.
*G03B 21/28*   (2006.01)
*F21V 7/00*    (2006.01)
(Continued)

(52) U.S. Cl.
CPC . *F21V 7/00* (2013.01); *F21V 13/04* (2013.01); *G02B 19/0028* (2013.01); *G02B 19/0057* (2013.01); *G02B 19/0066* (2013.01); *G02B 27/14* (2013.01); *G03B 21/2013* (2013.01);
(Continued)

(58) Field of Classification Search
CPC .... H04N 9/3164; G02B 27/283; G02B 21/28; F21S 48/1388; F21S 48/24; F21V 7/0083
USPC ........................................................ 353/98
See application file for complete search history.

(56) References Cited

U.S. PATENT DOCUMENTS 6,356,390 B1   3/2002   Hall, Jr.
8,167,440 B2   5/2012   Sato et al.
(Continued)

FOREIGN PATENT DOCUMENTS

EP   1 333 308 A2   8/2003
JP   2006-138952 A   6/2006
(Continued)

OTHER PUBLICATIONS

Extended European Search Report dated Nov. 18, 2013.
(Continued)

*Primary Examiner* — Sultan Chowdhury
*Assistant Examiner* — Danell L Owens
(74) *Attorney, Agent, or Firm* — IPUSA, PLLC

(57) ABSTRACT

An illumination light generation apparatus includes a light source unit and an emission unit. The light source unit includes first and second light source groups that radiate a plurality of light beams, respectively. The first and second light source groups face each other. The emission unit emits a composite light beam in a predetermined direction and includes a first reflection part that reflects the plurality of light beams radiated from the first light source group, and an emission part that reflects the plurality of light beams reflected from the first reflection part and the plurality of light beams radiated from the second light source group. The emission part generates the composite light beam by reflecting the plurality of light beams radiated from the first light source group and the plurality of light beams radiated from the second light source group in the predetermined direction.

11 Claims, 13 Drawing Sheets

(51) Int. Cl.
  *G02B 19/00* (2006.01)
  *G02B 27/14* (2006.01)
  *G03B 21/20* (2006.01)
  *F21V 13/04* (2006.01)
(52) U.S. Cl.
  CPC .... *G03B 21/2066* (2013.01); *G03B 2215/0582* (2013.01)

(56) References Cited

U.S. PATENT DOCUMENTS

2007/0007439 A1   1/2007   Nuebling
2010/0103519 A1   4/2010   Silverstein et al.
2010/0244700 A1*  9/2010   Chong et al. .................. 315/113

FOREIGN PATENT DOCUMENTS

| JP | 2006-163281 | 6/2006 |
| JP | 2008-090016 | 4/2008 |
| JP | 2011-013317 | 1/2011 |
| WO | WO 2006/027621 A2 | 3/2006 |
| WO | WO 2011/006501 A1 | 1/2011 |

OTHER PUBLICATIONS

Chinese Office Action dated May 25, 2015.

* cited by examiner

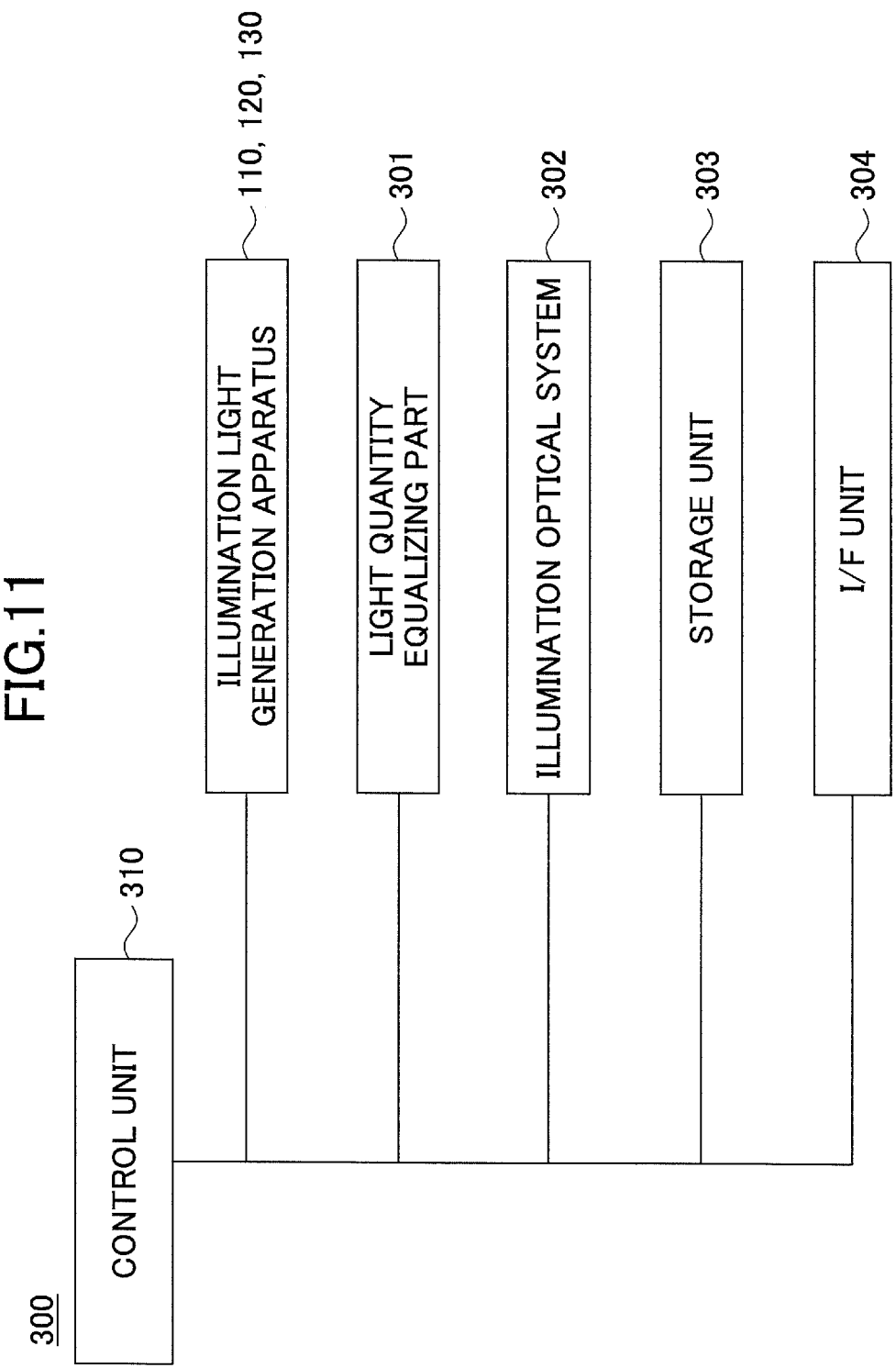

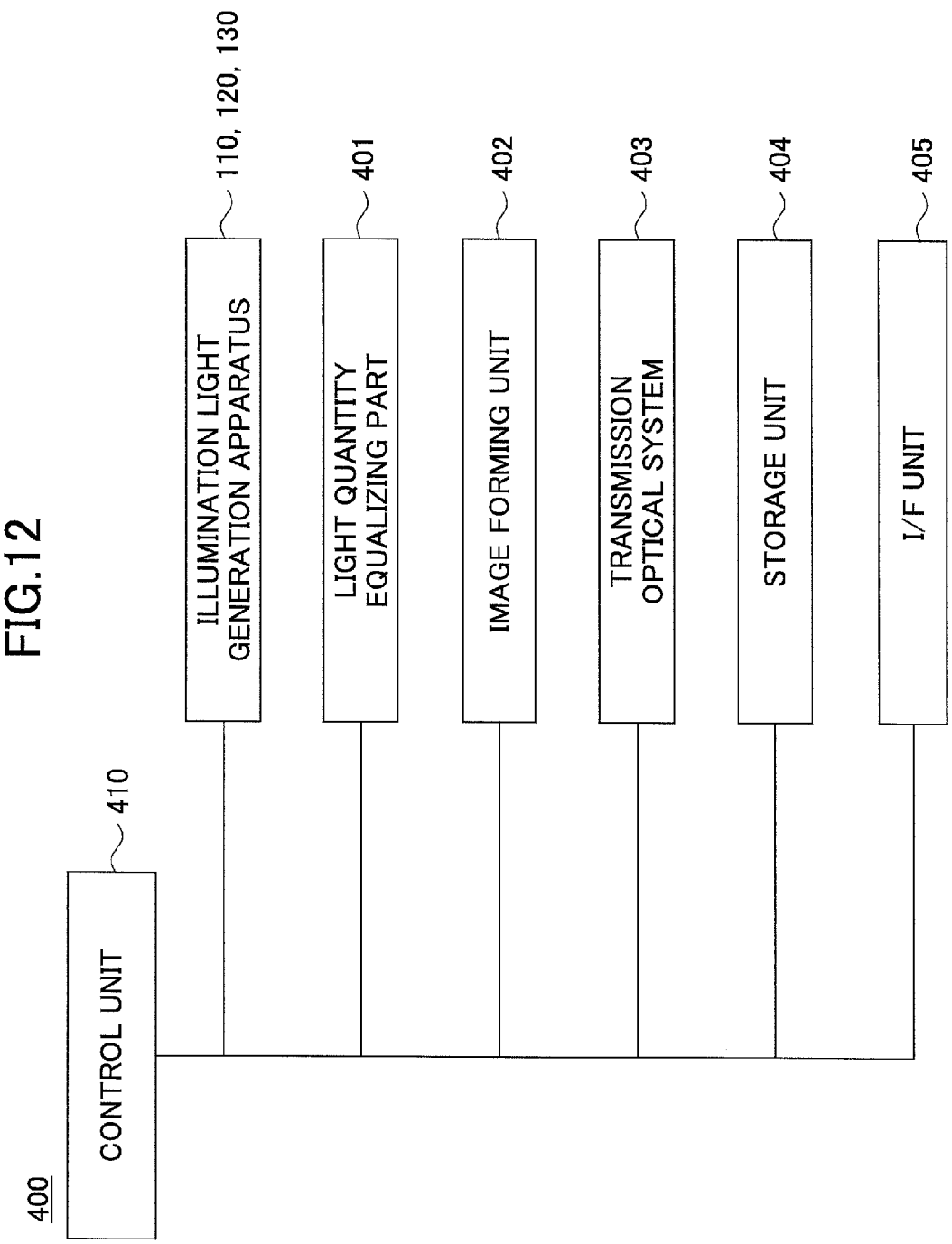

ILLUMINATION LIGHT GENERATION APPARATUS

BACKGROUND OF THE INVENTION

1. Field of the Invention

The present invention relates to an illumination light generation apparatus.

2. Description of the Related Art

Among various light radiation apparatuses (illumination light generation apparatuses), there is an apparatus that radiates light by compositing (combining) multiple light beams.

Japanese Laid-Open Patent Publication No. 2011-013317 teaches a technology pertaining to a light source unit (illumination light generation apparatus) including, for example, a light source group that has multiple light sources arranged to form a planar configuration, and a first reflection mirror group that reflects light beams emitted from the light source group.

However, with the technology taught in Japanese Laid-Open Patent Publication No. 2011-013317, the size of the illumination light generation unit may become large due to the multiple light sources arranged into rows and columns to form the planar configuration. Further, with the technology taught in Japanese Laid-Open Patent Publication No. 2011-013317, the size of the illumination light generation unit may also become large due to multiple reflection mirrors of the first reflection mirror group arranged in a step-like manner or due to strip-like reflection mirrors (equivalent to the number of rows of the light sources of the light source group) arranged parallel to a row direction of the light source group.

SUMMARY OF THE INVENTION

The present invention may provide an illumination light generation apparatus that substantially obviates one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by an illumination light generation apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides an illumination light generation apparatus including a light source unit including first and second light source groups that radiate a plurality of light beams, respectively, the first and second light source groups facing each other, and an emission unit that emits a composite light beam in a predetermined direction and includes a first reflection part that reflects the plurality of light beams radiated from the first light source group, and an emission part that reflects the plurality of light beams reflected from the first reflection part and the plurality of light beams radiated from the second light source group, wherein the emission part generates the composite light beam by reflecting the plurality of light beams radiated from the first light source group and the plurality of light beams radiated from the second light source group in the predetermined direction.

Other objects, features and advantages of the present invention will become more apparent from the following detailed description when read in conjunction with the accompanying drawings.

BRIEF DESCRIPTION OF THE DRAWINGS

FIG. 11 is a schematic diagram illustrating an illumination apparatus according to a second example of the present invention; and FIG. 12 is a schematic diagram illustrating a display apparatus according to a third example of the present invention.

DETAILED DESCRIPTION OF THE PREFERRED EMBODIMENTS

Figure 1:
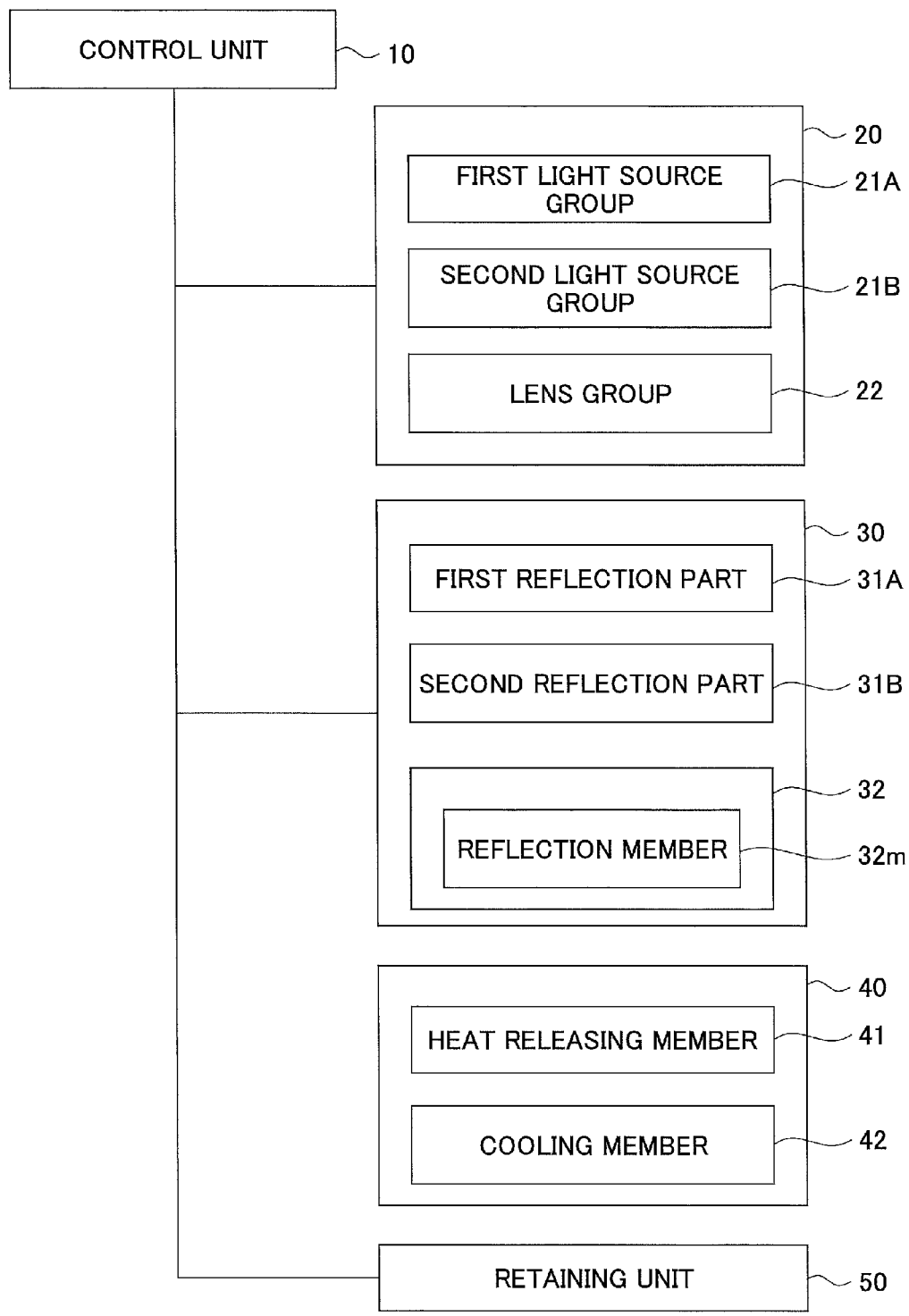
FIG. 1 is a schematic diagram illustrating an example of an illumination light generation apparatus according to a first embodiment of the present invention.

An illustrative and non-limitative embodiment of the present invention will be described by using an illumination light generation apparatus for radiating a composite light (light beam) obtained by compositing (combining) multiple light beams with reference to accompanying drawings. The below-described illumination light generation apparatus is an apparatus that can radiate (emit, output) one or more lights from one or more light sources.

It may also be possible to use an embodiment of the present invention in an illumination apparatus, a display apparatus, a light source apparatus, an optical scanning apparatus, an optical writing unit, an image forming (recording) apparatus, an image projection (projecting) apparatus, camera, a multifunction machine, a printer, a scanner, a facsimile machine, a bar code scanner, an on-vehicle laser radar, a wavelength variable laser, a medical laser, and others (devices, instruments, units, and the like) for compositing light, as well as an illumination light generation apparatus that will be described below.

Additionally, identical or corresponding reference numerals are attached to identical or corresponding members or components depicted in all of accompanying drawings in the following descriptions, and redundant descriptions will be omitted. Furthermore, the drawings do not aim to illustrate a relative ratio between members or components. Therefore, it may be possible for a person skilled in the art to determine a specific dimension in light of the following non-limitative embodiment(s).

First Embodiment

An illumination light generation apparatus 110 according to a first embodiment of the present invention is described with reference to FIGS. 1 to 5B.

As illustrated in FIG. 1, the illumination light generation apparatus 110 includes, for example, a control unit 10 that controls operations/processes of the illumination light generation apparatus 110, a light source unit 20 including multiple light sources from which multiple light beams are radiated, and an emission unit 30 that composites (combines) multiple light beams and emits a composite light beam. Further, the illumination light generation apparatus 110 may also include a temperature adjustment unit 40 that adjusts the temperature of the light source unit 20 including the multiple light sources and a retaining unit 50 that retains, for example, the light source unit 20.

As described in detail below, the illumination light generation apparatus 110 generates (radiates, emits) multiple light beams by using the light source unit 20. Further, the illumination light generation apparatus 110 composites (combines) multiple light beams and emits the composite multiple light beams (also simply referred to as "composite light beam") by using the light source unit 20 and the emission unit 30. Further, the illumination light generation apparatus 110 adjusts the temperature of the light source unit 20 including the multiple light sources by using the temperature adjustment unit 40.

The control unit 10 instructs the parts/units constituting the illumination light generation apparatus 110 to operate and controls operations/processes of the parts/units constituting the illumination light generation apparatus 110. For example, the control unit 10 controls a timing of radiating multiple light beams from the light source unit 20 including the multiple light sources (radiation timing), a light intensity (luminance) of the multiple light beams radiated from the light source unit 20, and a light quantity (amount of light) of the multiple light beams radiated from the light source unit 20 by controlling the operations/processes of the light source unit 20. Further, the control unit 10 controls a timing of radiating the composite light beam from the emission unit 30 (emission timing), a light intensity (luminance) of the composite light beam radiated from the emission unit 30, and a light quantity (amount of light) of the composite light beam radiated from the emission unit 30 by controlling the operations/processes of the emission unit 30. Further, the control unit 10 controls (adjusts) the temperature of the illumination light generation apparatus 110 including, for example, the light source unit 20 by controlling the operations/processes of the temperature adjustment unit 40. The control unit 10 may be a processing unit including, for example, a CPU (Central Processing Unit) and a memory.

The light source unit 20 is a unit that radiates light. In this embodiment, the light source unit 20 includes a first light source group 21A including multiple light sources from which multiple light beams are radiated, a second light source group 21B including multiple light sources from which multiple light beams are radiated, and a lens group 22 including multiple lenses that converge the multiple light beams radiated from, for example, the first and/or the second light source group 21A, 21B. For example, an LED (Light Emitting Diode), an LD (Laser Diode), an organic LED, or other illumination elements/devices may be used as the light sources included in the light source unit 20.

In a case where a semiconductor laser unit is used as a light source, the light source unit 20 or the illumination light generation apparatus 110 including the light source unit 20 can be formed as a small-sized high output unit or apparatus because semiconductor laser units have small size and provide high output. In addition, the light source unit 20 or the illumination light generation apparatus 11 including the light source unit 20 can also be formed as a small-sized high output unit or apparatus because semiconductor laser units can be integrated with high density.

Each of the first and second light source groups 21A, 21B includes multiple light sources that radiate multiple light beams. The first and second light source groups 21A, 21B are positioned facing each other. In this embodiment, the below-described retaining unit 50 is used for retaining a state where the first and second light source groups 21A, 21B are positioned facing each other as illustrated in FIG. 2.

Figure 3A:
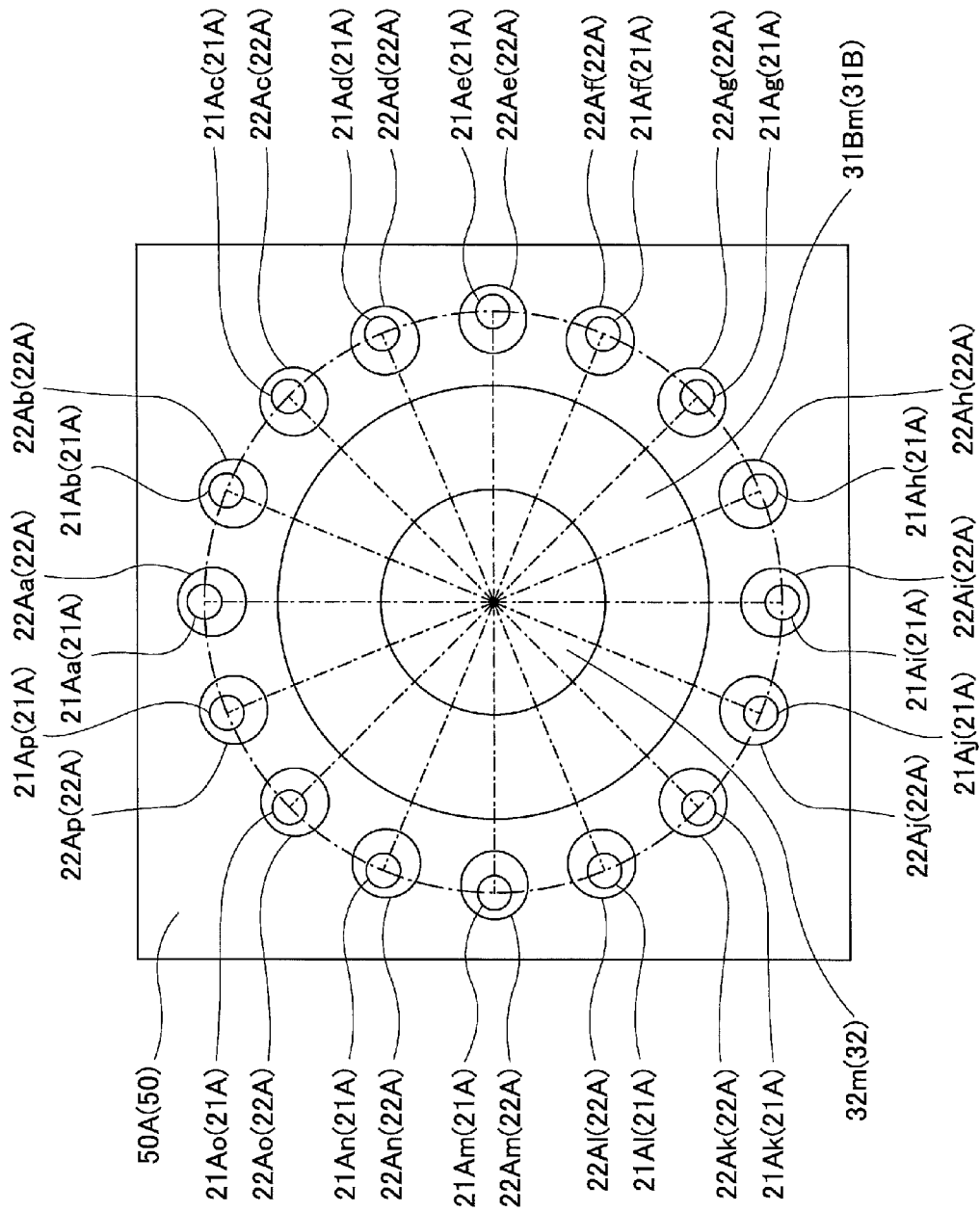
FIGS. 3A and 3B are cross-sectional views for describing an example of an illumination light generation apparatus according to an embodiment of the present invention.
Figure 4A:
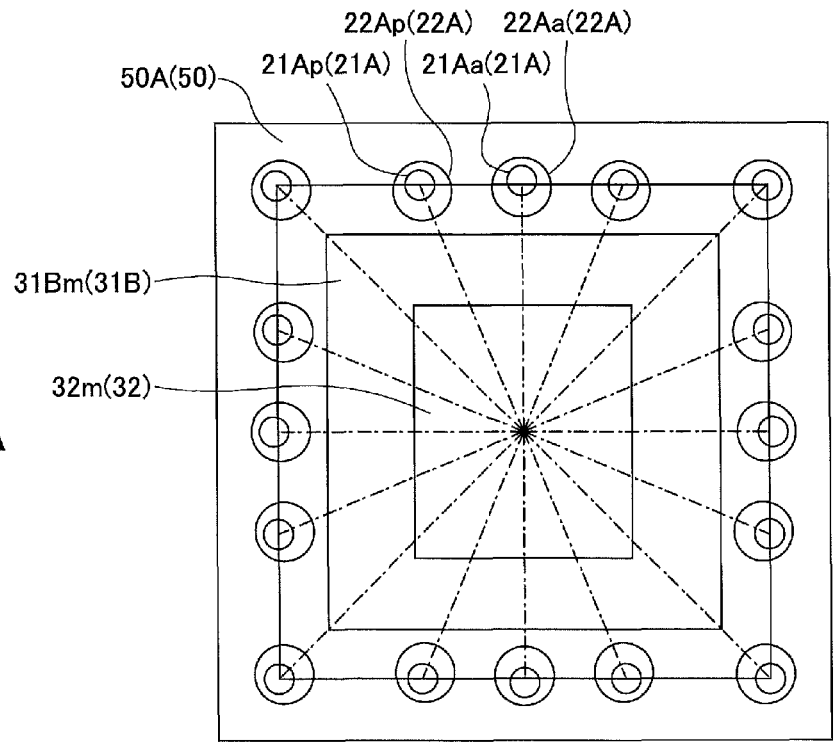
FIGS. 4A and 4B are cross-sectional views for describing another example of an illumination light generation apparatus according to an embodiment of the present invention.
Figure 4B:
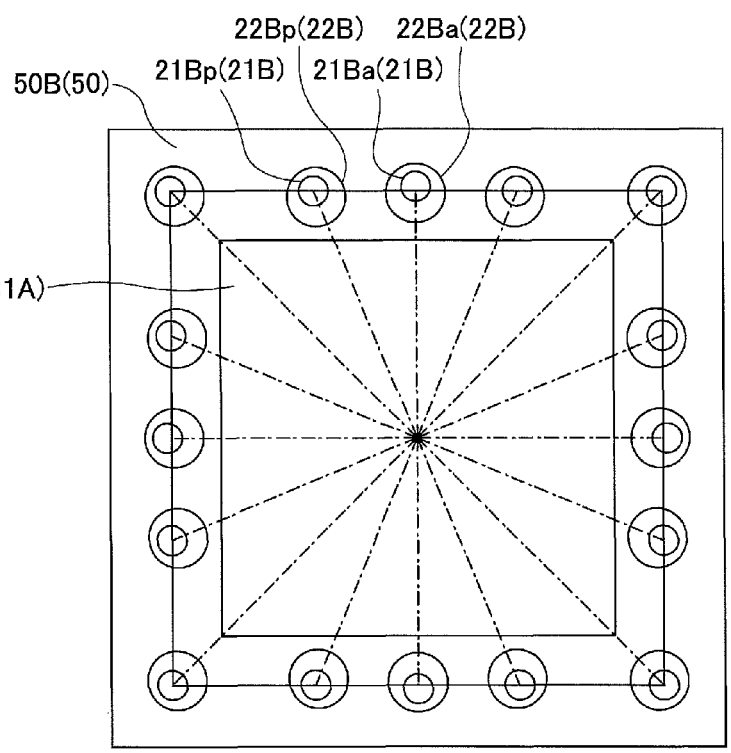

More specifically, the light source unit 20 may include, for example, the first light source group 21A having multiple light sources 21Aa-21Ap arranged in a substantially circular shape as illustrated in FIG. 3A. Likewise, the light source unit 20 may include, for example, the second light source group 21B having multiple light sources 21Ba-21Bp arranged in a substantially circular shape. Alternatively, the multiple light sources 21Aa-21Ap of the first light source group 21A may be arranged in a substantially quadrangular shape as illustrated in FIG. 4A. Likewise, the multiple light sources 21Ba-21Bp of the second light source group 21B may be arranged in a substantially quadrangular shape as illustrated in FIG. 4B. Alternatively, the multiple light sources 21Aa-21Ap of the first light source group 21A and the multiple light sources 21Ba-21Bp of the second light source group 21B may be arranged in other given shapes such as other circular shapes (e.g., elliptical shape), other polygonal shapes (e.g., rectangular shape), or non-polygonal shapes.

Figure 2:
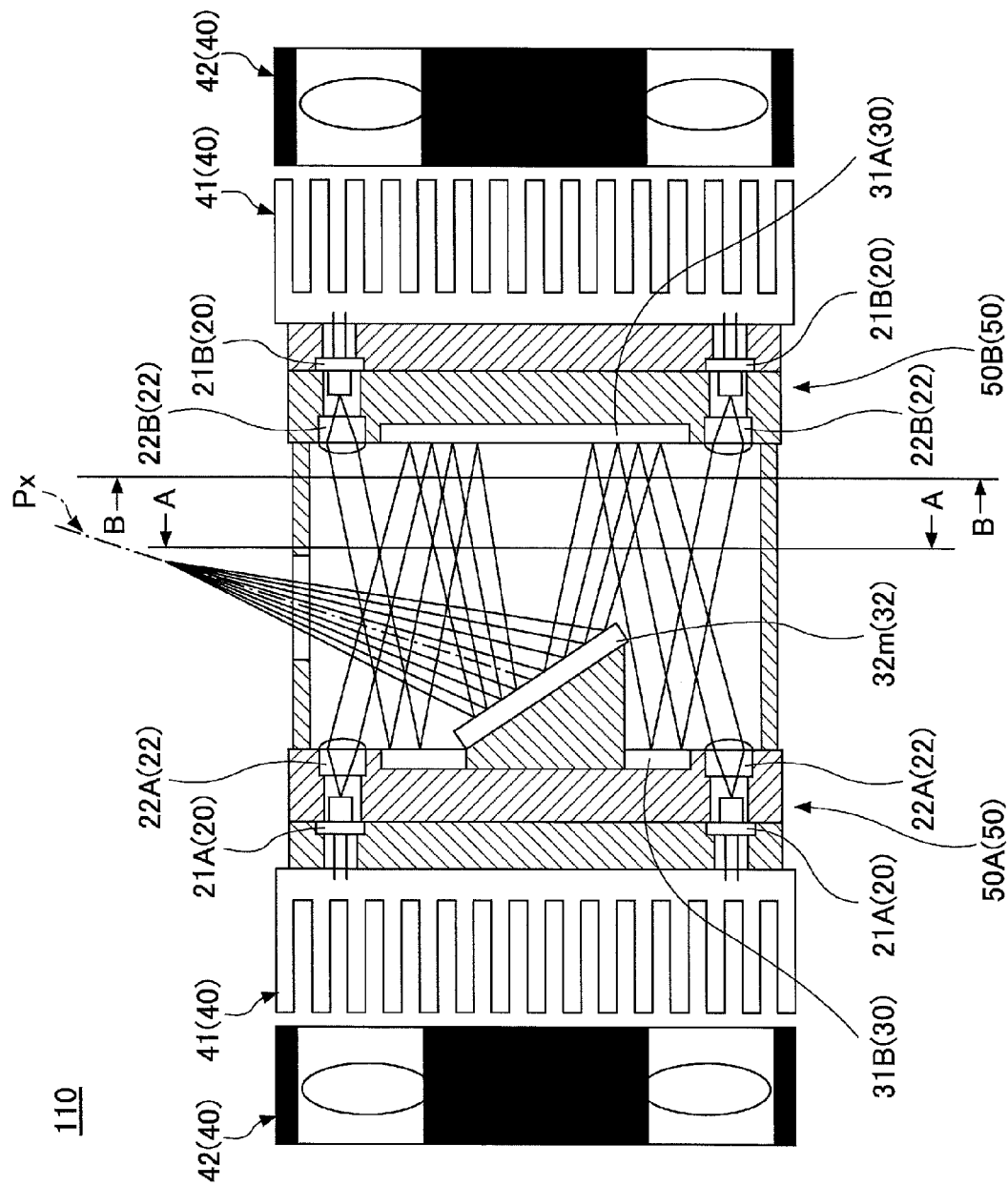
FIG. 2 is a schematic diagram for describing an example of an illumination light generation apparatus according to an embodiment of the present invention.
Figure 3B:
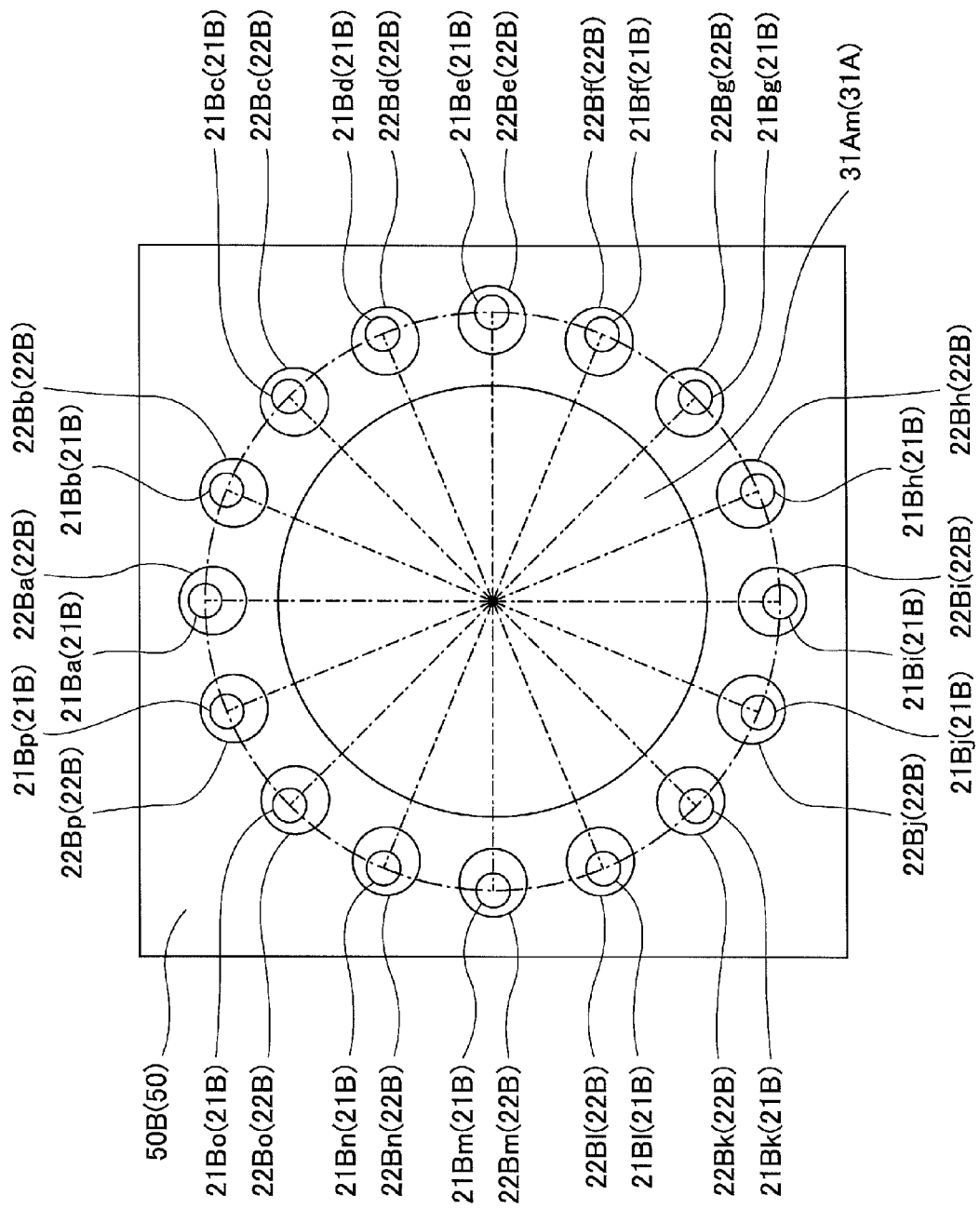

FIG. 3A is a cross-sectional view illustrating an example of the illumination light generation apparatus 110 taken along line A-A of FIG. 2. FIG. 3B is a cross-sectional view illustrating an example of the illumination light generation apparatus 110 taken along line B-B of FIG. 2. FIG. 4A is a cross-sectional view illustrating another example of the illumination light generation apparatus 110 taken along line A-A of FIG. 2. FIG. 4B is a cross-sectional view illustrating another example of the illumination light generation apparatus 110 taken along line B-B of FIG. 2.

The lens group 22 converges the light beams radiated from, for example, the multiple light sources 21Ba-21Bp of the second light source group 21B. In this embodiment, the lens group 22 includes a first lens group 22A corresponding to the first light source group 21A and a second lens group 22B corresponding to the second light source group 21B. The lens group 22 may use multiple lenses such as a collimator lens, a condenser lens, a coupling lens, and/or a convex lens. In this embodiment, multiple collimator lenses (e.g., 22Aa-22Ap in FIGS. 3A and 22Ba-22Bp) are used as the multiple lenses constituting the lens group 22. Accordingly, the lens group 22 can converge the multiple light beams radiated from the multiple light sources 21Aa-21Ap, 21Ba-21Bp to a single area without using condenser lenses. Accordingly, the number of components of the illumination light generation apparatus 110 can be reduced.

As illustrated in FIGS. 2 and 3A, the multiple collimator lenses 22Aa-22Ap of the first lens group 22A are positioned in corresponding optical paths of the multiple light beams radiated from the light sources 21Aa-21Ap of the first light source group 21A. Likewise, as illustrated in FIGS. 2 and 3B, the multiple collimator lenses 22Ba-22Bp of the second lens group 22B are positioned in corresponding optical paths of the multiple light beams radiated from the light sources 21Ba-21Bp of the first light source group 21B. Accordingly, the lens group 22 including the multiple collimator lenses 22Aa-22Ap, 22Ba-22Bp can generate multiple parallel light beams and converged light beams by converging each of the multiple light beams radiated from the multiple light sources 21Aa-21Ap, 21Ba-21Bp of the first and second light source groups 21A, 21B.

The emission unit 30 is a unit that emits a composite light beam. The emission unit 30 includes a first reflection part 31A that reflects the multiple light beams radiated from the first light source group 21A and a second reflection part 31B that reflects the multiple light beams radiated from the second light source group 21B. Further, the emission unit 30 includes an emission part 32 that emits light beams by reflecting light beams from the first reflection part 31A and reflecting light beams radiated from the second light source group 21B.

In this embodiment, light reflecting members are used to form the first reflection part 31A, the second reflection part 31B, and the emission part 32. For example, a mirror having a thin film of metal (e.g., aluminum) deposited on a surface of a glass substrate or a silicon substrate may be used as the light reflecting member. It is, however, to be noted that other light reflecting members may be used to form the first reflection part 31A, the second reflection part 31B, and the emission part 32.

Although this embodiment describes the emission unit 30 having a configuration including the second reflection part 31B, the emission unit 30 may be configured without including the second reflection part 31B. That is, the illumination light generation apparatus 110 may have a configuration in which the multiple light beams radiated from the second light source group 21B are directly incident on the emission unit 32.

The first reflection part 31A reflects the light beams radiated from the light source unit 20. In this embodiment, the first reflection part 31A is provided in a position facing the first light source group 21A as illustrated in FIG. 2. Accordingly, the first reflection part 31A can reflect one or more light beams transmitted through the lens group 22 (hereinafter also referred to as "transmitted light beam"). Further, the first reflection part 31A can reflect each of the multiple light beams radiated from the first light source group 21A and the second light source group 21B (multiple light beams reflected from the second reflection part 31B). By reflecting the multiple light beams with the first reflection part 31A, the light beams reflected from the first reflection part 31A (hereinafter also referred to as "reflected light beam") are incident on the emission part 32.

In a case where the multiple light sources 21Aa-21Ap of the first light source group 21A are arranged in a substantially circular shape as illustrated in FIG. 3A, the first reflection part 31A may include a first reflection member 31Am having a substantially circular shape as illustrated in FIG. 3B. Alternatively, in a case where the multiple light sources 21Aa-21Ap of the first light source group 21A are arranged in a substantially quadrangular shape as illustrated in FIG. 4A, the first reflection part 31A may include a first reflection member 31Am having a substantially quadrangular shape as illustrated in FIG. 4B. It is to be noted that the shape of the first reflection member 31Am is not limited to the substantially circular or quadrangular shapes illustrated in FIGS. 3B and 4B. That is, the first reflection member 31Am of the first reflection part 31A may have a shape corresponding to, for example, the shape of the arrangement of the multiple light sources 21Aa-21Ap of the first light source group 21A.

The second reflection part 31B also reflects the light beams radiated from the light source unit 20. In this embodiment, the second reflection part 31B is provided in a position facing the second light source group 21B as illustrated in FIG. 2. Accordingly, the second reflection part 31B can reflect one or more transmitted light beams transmitted through the lens group 22. Further, the second reflection part 31B can reflect each of the multiple light beams radiated from the second light source group 21B. By reflecting the multiple light beams with the second reflection part 31B, the light beams reflected from the second reflection part 31B are incident on the emission part 32.

In a case where the multiple light sources 21Ba-21Bp of the second light source group 21B are arranged in a substantially circular shape as illustrated in FIG. 3B, the second reflection part 31B may include a second reflection member 31Bm having a substantially circular shape as illustrated in FIG. 3A. Alternatively, in a case where the multiple light sources 21Ba-21Bp of the second light source group 21B are arranged in a substantially quadrangular shape as illustrated in FIG. 4A, the second reflection part 31B may include a second reflection member 31Bm having a substantially quadrangular shape as illustrated in FIG. 4A. It is to be noted that the shape of the second reflection member 31Bm is not limited to the substantially circular or quadrangular shapes illustrated in FIGS. 3A and 4A. That is, the second reflection member 31Bm of the second reflection part 31B may have a shape corresponding to, for example, the shape of the arrangement of the multiple light sources 21Ba-21Bp of the second light source group 21B.

The emission part 32 emits the multiple light beams radiated from the light source unit 20. In this embodiment, the emission part 32 is arranged in a position facing the first reflection part 31A as illustrated in FIG. 2. Accordingly, the emission part 32 can reflect (emit) the reflected beams from the first reflection part 31A in an emission direction Px. Further, the emission part 32 generates a composite light beam by reflecting the plural light beams radiated from the first and second light source groups 21A, 21B in the emission direction Px. That is, the emission part 32 generates a composite light beam by converging the plural light beams and/or reflected light beams in the emission direction Px and superimposing (compositing) the converged plural light beams and/or reflected light beams. Thereby, the emission part 32 can emit the generated composite light beam in the emission direction Px.

Further, in a case where the light sources 21Aa-21Ap of the first light source group 21A and the light sources 21Ba-21Bp of the second light source group 21B are arranged in a substantially circular shape as illustrated in FIGS. 3A and 3B, the emission part 32 may include a reflection member 32m having a substantially circular shape or a substantially elliptical shape. Alternatively, in a case where the light sources 21Aa-21Ap of the first light source group 21A and the light sources 21Ba-21Bp of the second light source group 21B are arranged in a substantially quadrangular shape as illustrated in FIGS. 4A and 4B, the emission part 32 may include a reflection member 32m having a substantially quadrangular shape or a substantially rectangular shape. It is, however, to be noted that the shape of the reflection member 32m is not limited to the substantially circular or quadrangular shape. That is, the reflection member 32m may have a shape corresponding to, for example, the multiple light beams incident on the emission part 32.

Further, the emission part 32 is arranged in a position corresponding to an emission direction from which light is emitted from the illumination light generation apparatus 110 and corresponding to an incident angle of the multiple light beams incident on the emission part 32. That is, as illustrated in FIG. 2, the emission part 32 is to be oriented in correspondence with the emission direction Px and positioned in correspondence with the incident angles of the multiple light beams (radiated from the first and second light source groups 21A, 21B) incident on the emission part 32. Accordingly, the emission part 32 can emit a composite light beam formed by compositing the multiple light beams from the first and second light source groups 21A, 21B in a predetermined emission direction (Px).

The temperature adjustment unit 40 is a unit that adjusts the temperature of the illumination light generation apparatus 110, and more specifically, the temperature of the light source unit 20. The temperature adjustment unit 40 includes a heat releasing member 41 to which the heat of the illumination light generation apparatus 110 (e.g., heat of the light sources in the light source unit 20) is transferred and a cooling member 42 that cools the heat releasing member 41.

The heat releasing member 41 can transfer the heat from the illumination light generation apparatus 110. That is, the heat releasing member 41 can cool the illumination light generation apparatus 110 including parts such as the light sources of the light source unit 20. The heat releasing member 41 cools the illumination light generation apparatus 110 by having heat transferred from the plural light sources of the light source unit 20 to the heat releasing member 41. In this embodiment, the heat releasing member 41 is provided on a side surface of the retaining unit 50 that is opposite to the direction in which the multiple light beams are radiated from the light source unit 20. More specifically, in the embodiment illustrated in FIG. 2, one heat releasing member 41 is provided on a side surface of the below-described first retaining unit 50A which is positioned on an opposite side with respect to the direction in which multiple light beams are radiated from the first light source group 21A, and another heat releasing member 41 is provided on a side surface of the below-described second retaining unit 50B which is positioned on an opposite side with respect to the direction in which multiple light beams are radiated from the second light source group 21B.

Figure 5B:
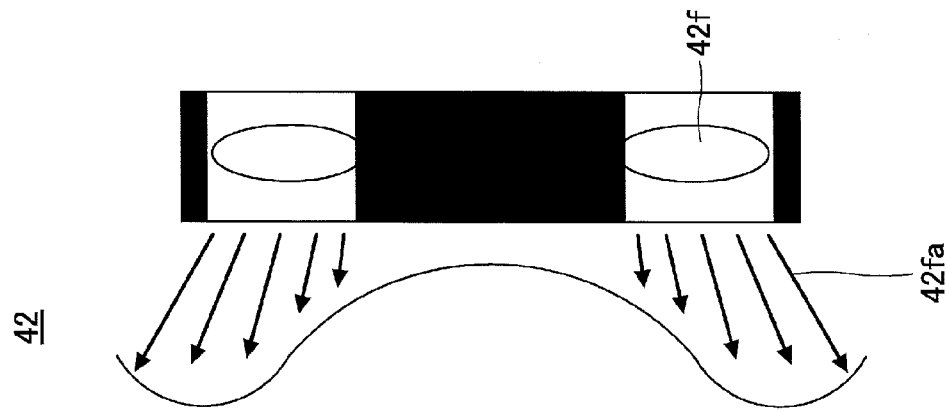
FIGS. 5A and 5B are schematic diagrams for describing an example of a temperature adjustment unit of an illumination light generation apparatus according to an embodiment of the present invention.
Figure 5A:
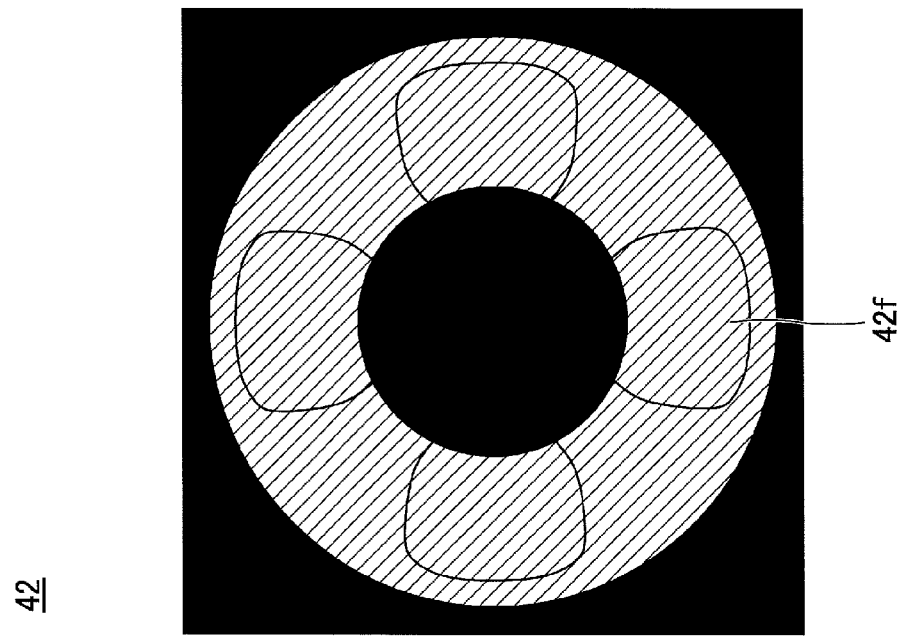

The cooling member 42 is a unit that cools the heat releasing member 41. In this embodiment, the cooling member 42 is provided on a side surface of the heat releasing member 41 that is opposite to a side with which the retaining member 50 contacts the heat releasing member 41. More specifically, in this embodiment illustrated in FIG. 2, one cooling member 42 is provided on a side surface of the heat releasing member 41 that is opposite to a side with which the first retaining member 50A contacts the heat releasing member 41, and another cooling member 42 is provided on a side surface of the heat releasing member 41 that is opposite to a side with which the second retaining member 50B contacts the heat releasing member 41. Further, as illustrated in FIGS. 5A and 5B, the cooling member 42 includes a cooling fan 42f. The cooling member 42 generates cooling air 42fa and delivers the cooling air 42fa to the heat releasing member 41. Thereby, the cooling member 42 can cool the illumination light generation apparatus 110 (more specifically, the heat releasing member 41) by using the cooling air 42fa.

The retaining unit 50 is a unit that retains, for example, the light source unit 20, the emission unit 30, and the temperature adjustment unit 40. In this embodiment, the retaining unit 50 includes the first retaining member 50A that retains, for example, the first light source group 21A and the second retaining member 50B that retains, for example, the second light source group 21B.

As illustrated in FIG. 2, the retaining unit (50A, 50B) retains the first and second light source groups 21A, 21B in a position in which the first and second light source groups 21A, 21B face each other. Further, the retaining unit 50 (50A) retains (supports) the first lens group 22A corresponding to the first light source group 21A, so that the first lens group 22A is positioned, for example, in an optical path of the first light source group 21A. Likewise, the retaining unit 50 (50B) retains (supports) the second lens group 22B corresponding to the second light source group 21B, so that the second lens group 22B is positioned, for example, in an optical path of the second light source group 21B. Further, the retaining unit 50 (50A) retains the temperature adjustment unit 40 by having a side surface that supports one heat releasing member 41 provided on an opposite side with respect to the direction in which multiple light beams are radiated from the first light source group 21A. Likewise, the retaining unit 50 (50B) retains the temperature adjustment unit 40 by having a side surface that supports another heat releasing member 41 provided on an opposite side with respect to the direction in which multiple light beams are radiated from the second light source group 21B.

Further, as illustrated in FIG. 2, the retaining unit 50 can retain the first and second light source groups 21A, 21B in positions in which the first and second light source groups 21A, 21B are separated a predetermined distance away from each other. Further, the retaining unit 50 can retain the first and second reflection parts 31A, 31B in positions in which the first and second reflection parts 31A, 31B are separated a predetermined distance away from each other. Further, the retaining unit 50 can retain the first reflection part 31A and the emission part 32 in positions in which the first reflection part 31A and the emission part 32 are separated a predetermined distance away from each other. Each of the aforementioned predetermined distances may be set in accordance with, for example, a direction in which the light beams radiated from the light source unit 20 (e.g., light sources 21Aa-21Ap) are to be reflected and/or deflected. Further, each of the aforementioned predetermined distances may be set in accordance with, for example, the distance between the light source unit 20A (e.g., light sources 21Aa-21Ap) and the emission unit 30 (e.g., first reflection part 31A), a direction in which multiple light beams are reflected from the emission unit 30 (e.g., first reflection part 31A), and/or the emission direction Px of the composite light emitted from the emission unit 30. Further, each of the aforementioned predetermined distances may be set with a value obtained by, for example, an experiment or a calculation performed beforehand.

It is to be noted that each component/part of the illumination light generation apparatus 110 may be manufactured by using, for example, a MEMS (Micro Electro Mechanical Systems) manufacturing process or a semiconductor manufacturing process. Thus, for example, the light source unit 20, the emission unit 30, and the retaining unit 50 may be integrally molded as a united body. By molding, for example, the light source unit 20 (including the lens group 22) and the retaining unit 50 into a united body, the precision of mounting (attaching) the light source unit 20 to the illumination light generation apparatus 110 can improved.

Further, with the illumination light generation apparatus 110 according to the above-described embodiment of the present invention, the temperature adjustment unit 40 can deliver cooling air having a substantially annular cross-section (ring-shaped profile) or a swirling flow (rotary flow pattern) corresponding to the substantially annular cross-section of the cooling member 42 by using the cooling fan 42f. Accordingly, by using the temperature adjustment unit 40 in the illumination light generation apparatus 110 according to the above-described embodiment of the present invention, the cooling air 42fa having a profile (or a flow pattern) corresponding to the substantially annular cross section of the cooling member 42 can cool the heat releasing member 41 which is heated in correspondence with the shapes of the light sources of the first and second light source groups 21A, 21B (e.g., substantially circular shapes illustrated in FIGS. 3A, 3B or substantially quadrangular shapes illustrated in FIGS. 4A, 4B).

In other words, because the illumination light generation apparatus 110 according to the above-described embodiment of the present invention uses the cooling fan 42f of the cooling member 42 of the temperature adjustment unit 40 to cool the heat releasing member 41 with the cooling air 42fa having a substantially annular cross-section (defined by the substantially annular-shaped cross section of the cooling member 42), the illumination light generation apparatus 110 (more specifically, the light source unit 20) can be efficiently cooled. Further, because the heat generated from the plural light sources of the light source unit 20 can be transferred to the retaining unit 50, the heat can be evenly distributed (spread) in the retaining unit 50, and the distribution of the temperatures of the multiple light sources of the light source unit 20 can become substantially uniform. Accordingly, the illumination light generation apparatus 110 according to the above-described embodiment of the present invention can prevent the temperature of only a specific light source included the multiple light sources of the light source unit 20 from increasing and prevent the temperatures of the multiple light sources of the light source unit 20 from increasing by using the retaining unit 50. Thus, the performance for cooling the multiple light sources of the light source unit 20 can be improved.

<Operation for Radiating Light>

Next, an example of an operation of radiating light with the illumination light generation apparatus 110 according to the first embodiment of the present invention is described with reference to FIG. 2, FIGS. 6A, and 6B.

In the below-described example, a composite light beam is emitted from the illumination light generation apparatus 110 in one direction (direction Px in FIG. 2). However, the direction in which the composite light beam is emitted from the illumination light generation apparatus 110 is not limited to the direction of the below-described example. That is, the illumination light generation apparatus 110 may emit light (composite light beam) in another direction according to, for example, a positional relationship between the light source unit 20 and the emission unit 30.

As illustrated in FIG. 2, in order to emit a composite light beam from multiple light beams radiated from multiple light sources, first, the illumination light generation apparatus 110 radiates light beams from the light sources of the light source unit 20 (i.e., light sources 21Aa-21Ap, 21Ba-21Bp (FIGS. 3A-3B or FIGS. 4A-4B) of the first and second light source groups 21A, 21B). When the light sources of the light source groups 21A, 21B radiate the light beams, the light beams radiated from the light source unit 20 are incident on the corresponding lenses of the first and second lens groups 22A, 22B (i.e., collimator lenses 22Aa-22Ap, 22Ba-22Bp (FIGS. 3A-3B or FIGS. 4A-4B)). Further, the illumination light generation apparatus 110 generates transmitted light beams by allowing the light beams incident on the multiple lenses of the first and second lens groups 22A, 22B to be transmitted through the multiple lenses of the first and second lens groups 22A, 22B. The generated transmitted light beams from the first and second lens groups 22A, 22B are incident on the emission unit 30 (more specifically, the first reflection part 31A, the second reflection part 31B, or the emission part 32).

Further, the illumination light generation apparatus 110 may generate parallel light beams (parallel transmitted light beams) by allowing the multiple light beams radiated from the light sources of the light source unit 20 to transmit through the multiple lenses of the lens group 22 (first and second lens groups 22A, 22B). Further, the illumination light generation apparatus 110 may also generate transmitted light beams other than parallel light beams.

The illumination light generation apparatus 110 may change (deflect) the propagating direction of the transmitted light beams to a direction toward the emission unit 30 by separating a center axis of the bundle of light beams radiated from the light source unit 20 and an optical axis of the collimator lenses of the lens group 22 (described in detail below). Further, the light source unit 20 may be mounted on the illumination light generation apparatus 110, so that the light beams radiated from the light source unit 20 are oriented in a direction toward the emission part 32 of the emission unit 30 (described in detail below).

Figure 6A:
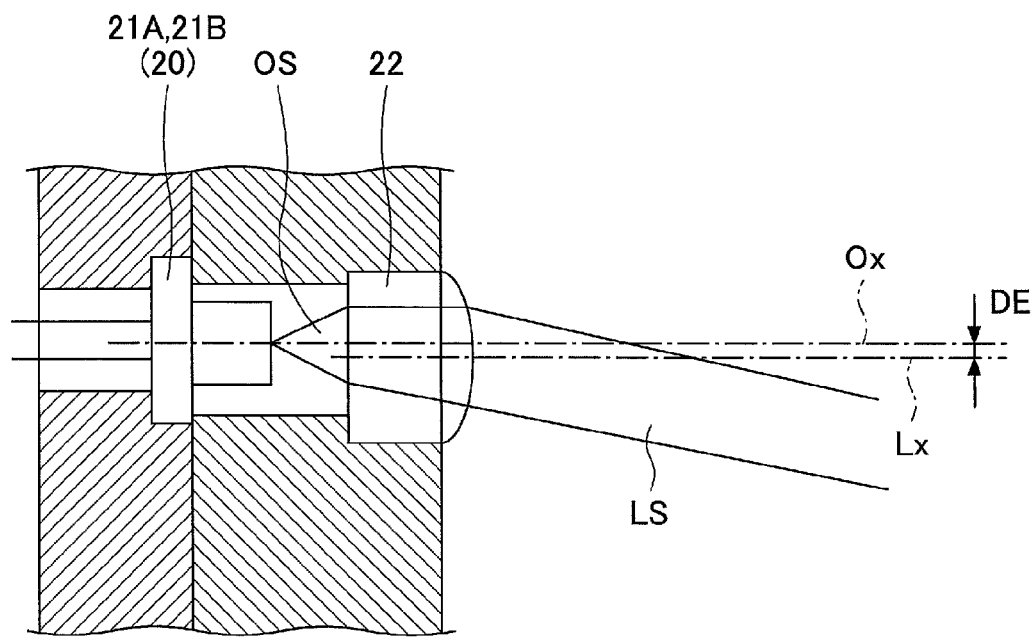
FIGS. 6A and 6B are schematic diagrams for describing an emission direction of a light source unit of an illumination light generation apparatus according to an embodiment of the present invention.
Figure 6B:
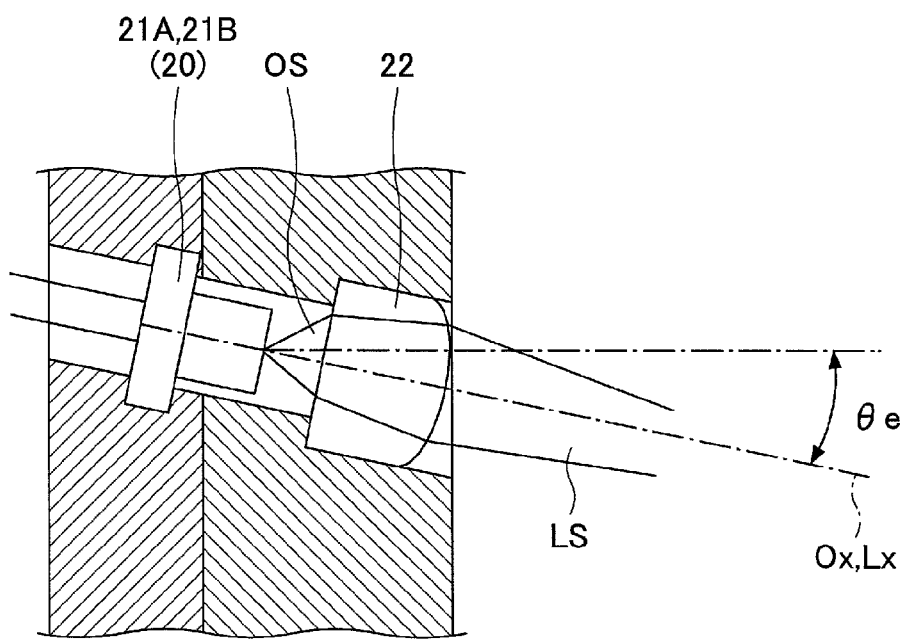

As illustrated in FIGS. 2 and 6A, the illumination light generation apparatus 110 radiates a bundle of light beams OS from the first and the second light source groups 21A, 21B of the light source unit 20 and allows a bundle of light beams LS to transmit through the lens group 22, so that a center axis Ox of the bundle of light beams OS (i.e. bundle of radiated light beams prior to being transmitted through the lens group 22) and an optical axis Lx of the collimator lens of the lens group 22 are separated a predetermined distance DE away from each other. Accordingly, the illumination light generation apparatus 110 enables the light beams (radiated from the light source unit 20 and transmitted through the lens group 22) LS to be deflected in a direction toward the emission unit 30 in correspondence with the amount in which the center axis Ox and the optical axis Lx are separated (i.e. predetermined distance DE). That is, the illumination light generation apparatus 110 allows light beams radiated from the light source unit 20 to be incident on the emission unit 30 (more specifically, the first reflection part 31A, the second reflection part 31B, or the emission part 32) by using the light source unit 20. Because no condenser lens, mirrors or the like are required for deflecting the light beams radiated from the light source unit 20, the number of components of the illumination light generation apparatus 110 can be reduced.

Further, the light source unit 20 may be mounted on the illumination light generation apparatus 110, so that the center axis of the bundle of light beams OS is inclined a predetermined angle. That is, the light source groups 21A, 21B of the light source unit 20 may be positioned in a manner that the center axis Ox of the bundle of light beams OS forms a predetermined angle ($\theta e$ in FIG. 6B) with respect to a direction toward the emission unit 30 (more specifically, the first reflection part 31A, the second reflection part 31B, or the emission part 32). Accordingly, the illumination light generation apparatus 110 allows light beams radiated from the light source unit 20 to be incident on the emission unit 30 (more specifically, the first reflection part 31A, the second reflection part 31B, or the emission part 32) at a predetermined incident angle by using the light source unit 20.

Then, the illumination light generation apparatus 110 uses the first reflection part 31A or the second reflection part 31B to reflect the transmitted light beams transmitted through the lens group 22 (more specifically, the collimator lenses 22Aa-22Ap, 22Ba-22Bp). Further, the illumination light generation apparatus 110 uses the emission part 32 to converge the reflected light beams reflected from the first or second reflection parts 31A, 31B and generate a composite light beam from the converged reflected light beams.

More specifically, as illustrated in FIG. 2, with the illumination light generation apparatus 110 of this embodiment, multiple light beams radiated from the first light source group 21A are reflected from the first reflection part 31A and incident on the emission part 32. Further, with the illumination light generation apparatus 110 of this embodiment, the multiple light beams radiated from the second light source group 21B are reflected from the second reflection part 31B and incident on the emission part 32 after being reflected from the first reflection part 31A. Then, the illumination light generation apparatus 110 uses the emission part 32 to converge the incident reflected light beams from the first and second reflection parts 31A, 31B and reflect the converged light beam toward the emission direction Px. Accordingly, the illumination light generation apparatus 110 can generate a composite light beam by superimposing the reflected light beams. The illumination light generation unit 110 can cause the reflected light beams to be incident on the emission part 32 after reflecting the transmitted light beams for a number of times between the first and second reflection parts 31A, 31B.

Then, the illumination light generation apparatus 110 emits the composite light beam in the emission direction Px. Thereby, the operation of emitting a composite light from the illumination light generation apparatus 110 is completed.

Hence, with the illumination light generation apparatus 110 according to the above-described embodiment of the present invention, a composite light beam can be generated by compositing multiple light beams radiated from multiple light sources included in multiple light source groups. Accordingly, the brightness, light intensity, illuminance, or the like of the radiated light beam (composite light beam) can be increased. Thus, a high output light beam can be radiated from the illumination light generation apparatus 110. Further, with the illumination light generation apparatus 110, because a high output light beam can be radiated by using a light source group including multiple light sources, size-reduction can be achieved with the illumination light generation apparatus 110 compared to an apparatus that composites multiple light beams of two light source groups after the multiple light beams have been radiated.

Second Embodiment

Next, an illumination light generation apparatus 120 according to a second embodiment of the present invention is described.
(Configuration of Illumination Light Generation Apparatus and Operation of Radiating Light)

A configuration and operation of the illumination light generation apparatus 120 are described with reference to FIGS. 1, and 3A-7. In the second embodiment, like components/parts are denoted with like reference numerals as those of the first embodiment and are not further explained.

Figure 7:
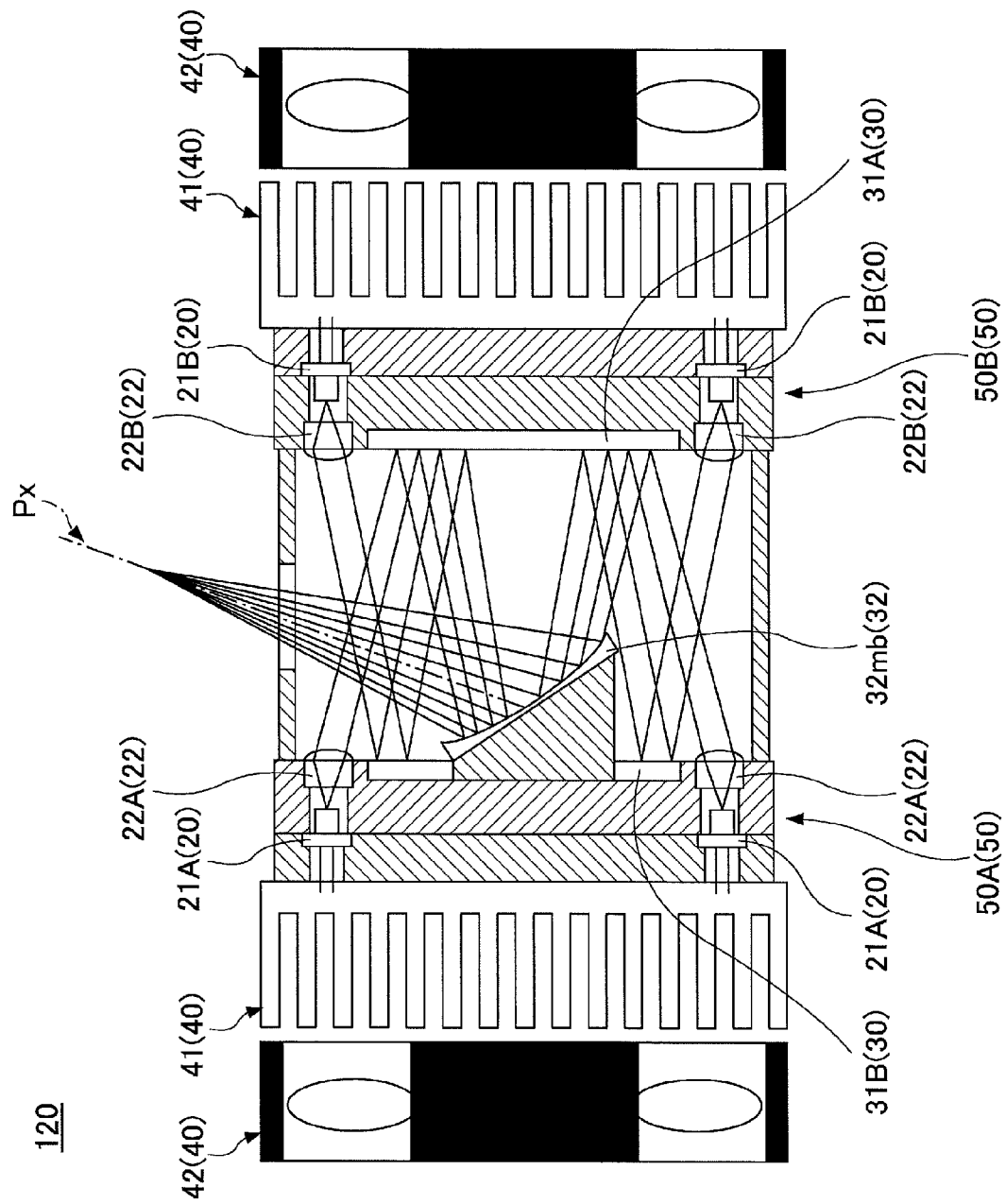
FIG. 7 is a schematic diagram for describing an example of an illumination light generation apparatus according to a second embodiment of the present invention.

As illustrated in FIG. 7, in the illumination light generation apparatus 120 of this embodiment, the emission part 32 of the emission unit 30 includes a reflection member 32mb having a curved surface. In this embodiment, the illumination light generation apparatus 120 uses a concave mirror as the reflection member 32mb.

In this embodiment, the reflection member 32mb reflects (emits) a light beam(s) reflected from the first reflection part 31A in the emission direction Px. In a case of reflecting the light beam(s) reflected from the first reflection part 31A with the reflection member 32mb, the reflection member 32mb can reflect multiple light beams reflected from the first reflection part 31A while converging the multiple light beams by using the curved surface. In other words, the reflection member 32mb can reduce the angle of diffusion of the multiple light beams reflected from the first reflection part 31A by using the curved surface.

Hence, because the illumination light generation apparatus 120 of the second embodiment can converge reflected light beams by using the reflection member 32mb having a curved surface, the number of times of reflecting light beams (e.g., transmitted light beams, reflected light beams) between the first and second reflection parts 31A, 31B can be reduced. Further, with the illumination light generation apparatus 120 of the second embodiment, the optical paths of the light sources of the light source unit 20 can be shortened owing to the reduction in the number of times of reflecting light beams (e.g., transmitted light beams, reflected light beams) between the first and second reflection parts 31A, 31B. Accordingly, further size-reduction can be achieved for the illumination light generation apparatus 120 of the second embodiment. Further, with the illumination light generation apparatus 120 of the second embodiment, loss of light quantity during reflection can be reduced owing to the reduction in the number of times of reflecting light beams (e.g., transmitted light beams, reflected light beams) between the first and second reflection parts 31A, 31B.

Further, the illumination light generation apparatus 120 of the second embodiment can also attain substantially the same effects attained by the illumination light generation apparatus 110 of the first embodiment.

Third Embodiment

Next, an illumination light generation apparatus 130 according to a third embodiment of the present invention is described.
(Configuration of Illumination Light Generation Apparatus and Operation of Radiating Light)

A configuration and operation of the illumination light generation apparatus 130 are described with reference to FIGS. 1, 3A-6, and 8. In the third embodiment, like components/parts are denoted with like reference numerals as those of the first embodiment and are not further explained.

Figure 8:
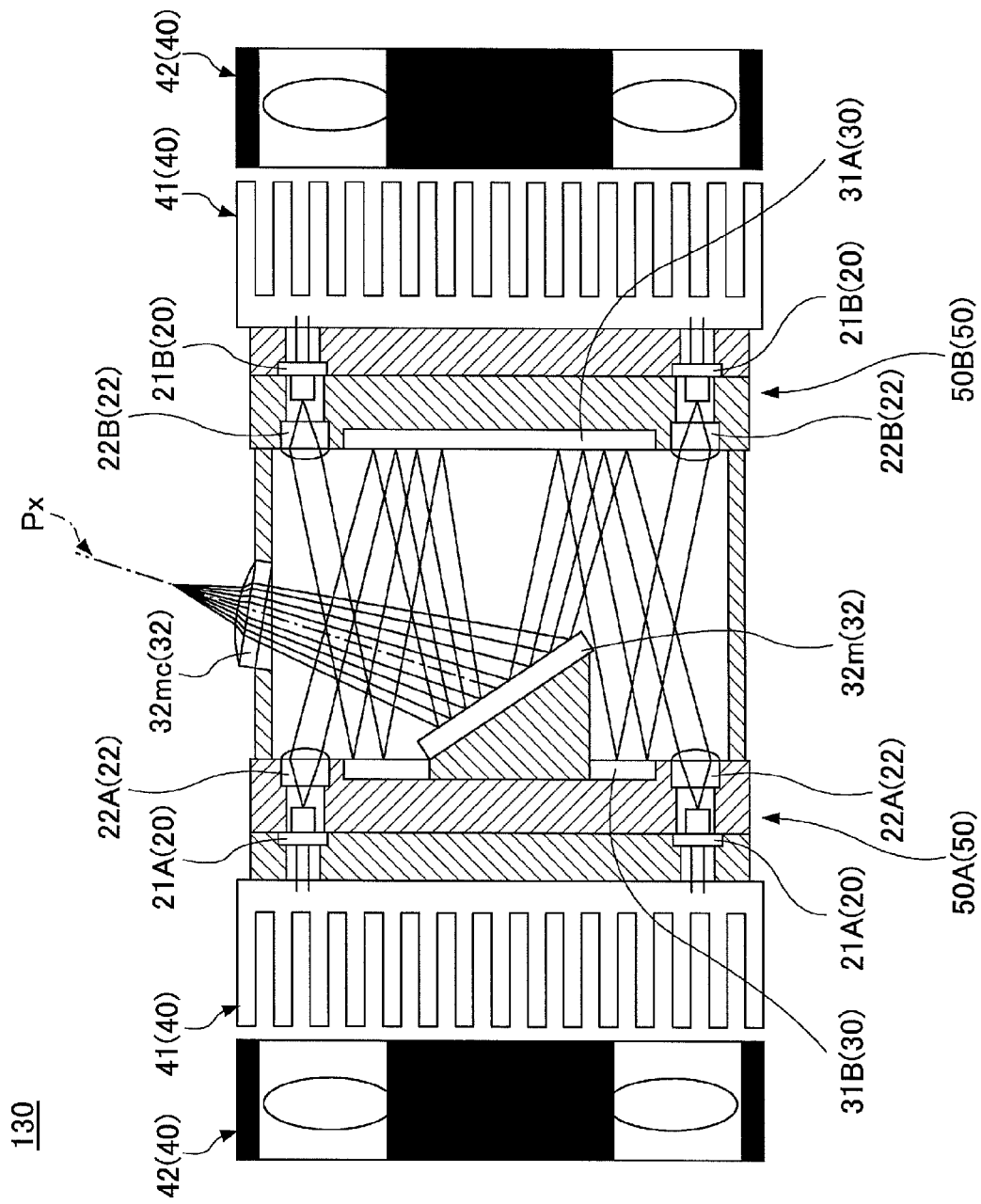
FIG. 8 is a schematic diagram for describing an example of an illumination light generation apparatus according to a third embodiment of the present invention.

As illustrated in FIG. 8, in the illumination light generation apparatus 130 of this embodiment, the emission part 32 of the emission unit 30 further includes a condenser lens 32mc. In this embodiment, the illumination light generation apparatus 130 uses, for example, a convex lens as the condenser lens 32mc.

In this embodiment, the condenser lens 32mc can condense (converge) light beams reflected from the reflection member 32m of the emission part 32. That is, the condenser lens 32mc can condense the multiple light beams radiated from the multiple light sources of the light source unit 20 and shorten a focal distance of the condensed light beams.

Hence, because the illumination light generation apparatus 130 of the third embodiment can condense the light beams reflected from the reflection member 32m by using the condenser lens 32mc, the number of times of reflecting light beams (e.g., transmitted light beams, reflected light beams) between the first and second reflection parts 31A, 31B can be reduced. Further, with the illumination light generation apparatus 130 of the third embodiment, the optical paths of the light sources of the light source unit 20 can be shortened owing to the reduction in the number of times of reflecting light beams (e.g., transmitted light beams, reflected light beams) between the first and second reflection parts 31A, 31B. Accordingly, further size-reduction can be achieved for the illumination light generation apparatus 130 of the third embodiment. Further, with the illumination light generation apparatus 130 of the third embodiment, loss of light quantity during reflection can be reduced owing to the reduction in the number of times of reflecting light beams (e.g., transmitted light beams, reflected light beams) between the first and second reflection parts 31A, 31B.

Further, the illumination light generation apparatus 130 of the third embodiment can also attain substantially the same effects attained by the illumination light generation apparatus 110 of the first embodiment.

EXAMPLES

First Example

Next, an image projection apparatus 200 according to a first example of the present invention is described. The image projection apparatus 200 of the first example includes one of the above-described illumination light generation apparatuses 110, 120, 130 of the first-third embodiments of the present invention. It is to be noted that the term "image projection apparatus" includes any apparatus that projects an image (including video) on a target projection object. The image projection apparatus 200 of the first example may be any projection apparatus (projector) that projects an image on a target projection object (including extended projection) by using a composite light beam formed by compositing multiple light beams.

(Configuration of Image Projection Apparatus)

A configuration of the image projection apparatus 200 according to the first example is described with reference to FIG. 9. It is to be noted that, because one of the above-described illumination light generation apparatuses 110, 120, 130 of the first-third embodiments of the present invention is included in the configuration of the image projection apparatus 200, parts/units different from those described in the first-third embodiments are mainly described below.

Figure 9:
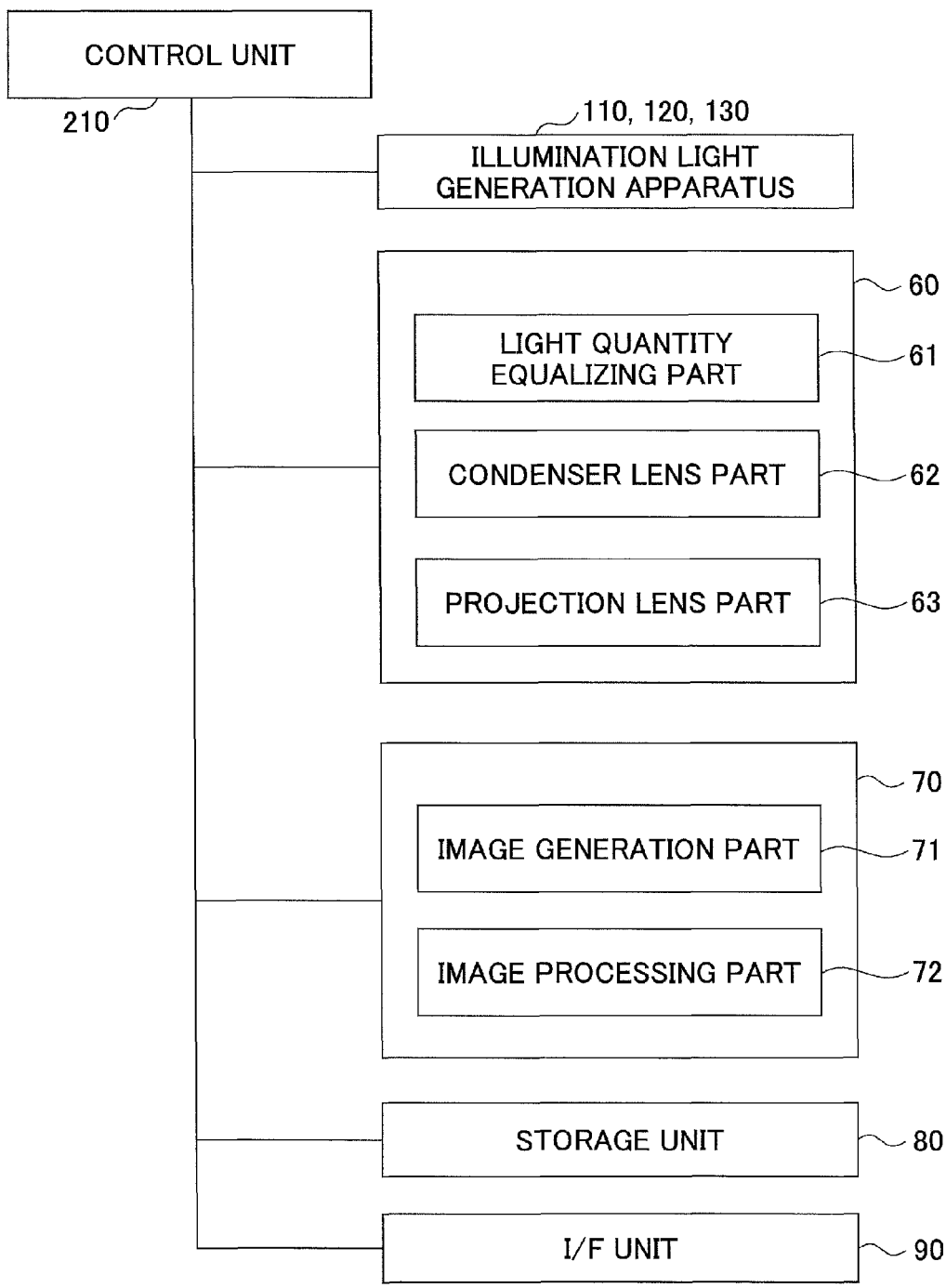
FIG. 9 is a schematic diagram illustrating an image projection apparatus according to a first example of the present invention.

As illustrated in FIG. 9, the image projection apparatus 200 includes one of the above-described illumination light generation apparatuses 110, 120, 130 of the first-third embodiments of the present invention. Further, the image projection apparatus 200 includes a projection optical system 60 that projects an image by using a composite light beam (radiation light beam) composited by the illumination light generation apparatus (110, 120, or 130), and an image forming unit 70 that forms an image to be projected on a target projection object. Further, the image projection apparatus 200 includes a control unit 210 that controls operations/processes of each part/unit constituting the image projection apparatus 200, a storage unit 80 that stores data (e.g., operation status of the image projection apparatus 200, operation conditions of the image projection apparatus 200) therein, and an I/F (interface) unit 90 that performs input/output of data with respect to an external device outside of the image projection apparatus 200.

The control unit 210 instructs the parts/units constituting the image projection apparatus 200 to operate and controls operations/processes of the parts/units constituting the image projection apparatus 200. For example, the control unit 210 controls a timing of radiating multiple light beams from the light source unit 20 including the multiple light sources (radiation timing), light intensity (luminance) of the multiple light beams radiated from the light source unit 20, and a light quantity (amount of light) of the multiple light beams radiated from the light source unit 20 by controlling the operations/processes of the light source unit 20. Further, the control unit 210 controls a timing of emitting the composite light beam from the illumination light generation apparatus 110, 120, or 130 (emission timing), light intensity (luminance) of the composite light beam emitted from the illumination light generation apparatus 110, 120, or 130, and a light quantity (amount of light) of the composite light beam emitted from the illumination light generation apparatus 110, 120, or 130 by controlling the operations/processes of the light source unit 20. Further, the control unit 210 controls operations pertaining to an image to be projected by controlling the operations/processes of the projection optical system 60 and the image forming unit 70.

It is to be noted that a program (e.g., control program, application) may be stored beforehand in, for example, the storage unit 80, so that the control unit 210 can control the projection optical system 60 and the image forming unit 70 by using the program. Further, the control unit 210 may control operations of, for example, the illumination light generation apparatus 110, 120, or 130, the projection optical system 60, and the image forming unit 70 based on data input from an input unit (not illustrated) included in the I/F unit 90.

The projection optical system 60 is a unit for projecting an image on a target projection object by using a composite light beam composited (combined) by the illumination light generation apparatus 110, 120, or 130. In this embodiment, the projection optical system 60 includes a light quantity equalizing part 61 for equalizing, for example, light quantities and the like (e.g., illuminance, light intensity, brightness) of the light beams constituting the composite light emitted from the illumination light generation apparatus 110, 120, or 130, a condenser lens part 62 for radiating the light beams having their light quantities and the like equalized by the light quantity equalizing part 61 to an image formed by the image forming unit 70, and a projection lens part 63 for projecting light beams transmitted through the image formed by the image forming unit 70.

The light quantity equalizing part 61 equalizes the light quantities and the like (e.g., illuminance, light intensity, brightness) of the light beams constituting the composite light beam emitted from the illumination light generation apparatus 110, 120, or 130. The light quantity equalizing part 61 may use, for example, a rod integrator, a quadrangular column lens, etc. For example, the rod integrator may be formed of a glass rectangular column that equalizes the distribution of light intensity (luminous intensity distribution) of light beams incident on one end of the rectangular column by causing total internal reflection of the incident light beams inside the rectangular column and emits the equalized light beams from the other end of the rectangular column.

The condenser lens part 62 radiates the light beams emitted from the light quantity equalizing part 62 to the image formed by the image forming unit 70. That is, the condenser lens part 62 radiates light beams equalized by the light quantity equalizing part 61 to the image (e.g., image panel) formed by the image forming unit 70. The condenser lens part 62 may use, for example, a relay lens.

The projection lens part 63 projects light beams transmitted through the image formed by the image forming unit 70.

In this embodiment, the projection lens part 63 projects (forms) an image on a surface of the target projection object with the light beams transmitted through the image formed by the image forming unit 70. The projection lens part 63 may increase or reduce the size of the image to be projected (magnification/reduction) by using multiple lenses.

The image forming unit 70 is a unit that forms an image to be projected. In this embodiment, the image forming unit 70 includes an image generation part 71 for generating the image to be projected, and an image processing part 72 for processing the image generated by the image generation part 71.

The image generation part 71 generates the image to be projected based on data stored in the storage unit 80 (e.g., image data) and/or data input from the I/F unit 90. In this embodiment, the image generation part 71 displays the generated image on a transmission type image panel formed in correspondence with modulation signals. It is, however, to be noted that the generated image may be displayed on an image panel other than the transmission type image panel. For example, the image generation part 71 may display the generated image on a reflection type panel or a DMD (Digital Micromirror Device) type panel.

The image processing part 72 performs various processes on the generated image according to, for example, the status/conditions (e.g., distance with respect to the target projection object, positional relationship with respect to the target projection object) for projecting the image. The processes performed on the generated image may include, for example, editing, deformation, adjustment, and trapezoidal distortion correction.

The storage unit 80 is a unit that stores data pertaining to the image projection apparatus 200 such as data pertaining to operations of the image projection apparatus 200, data pertaining to the status of the image projection apparatus 200, or data pertaining to processes of the image projection apparatus 200. The storage unit 80 may use known devices such as a hard disk, a DVD (Digital Versatile Disc), a memory, a ROM (Read Only Memory), and/or a RAM (Random Access Memory).

The I/F unit 90 is a unit that performs input/output of data (e.g., electric signals) between the image projection apparatus 200 and an external device outside the image projection apparatus 200. The I/F unit 90 may receive input of data pertaining to an image to be projected from the external device (e.g., PC (Personal Computer)). The I/F unit 90 may also output data pertaining to the image projection apparatus 200 to the external device (e.g., PC (Personal Computer)). The I/F unit 90 may include an input part (not illustrated) to which data is input from the external device of the user. The input part may include a user interface such as an operation panel. Further, the I/F unit 90 may also include an output part for outputting data to the external device. The output part may include a display part such as a touch panel.

(Operation of Projecting an Image)

Next, an operation of projecting an image with the image projection apparatus 200 according to the first example is described with reference to FIG. 10.

Figure 10:
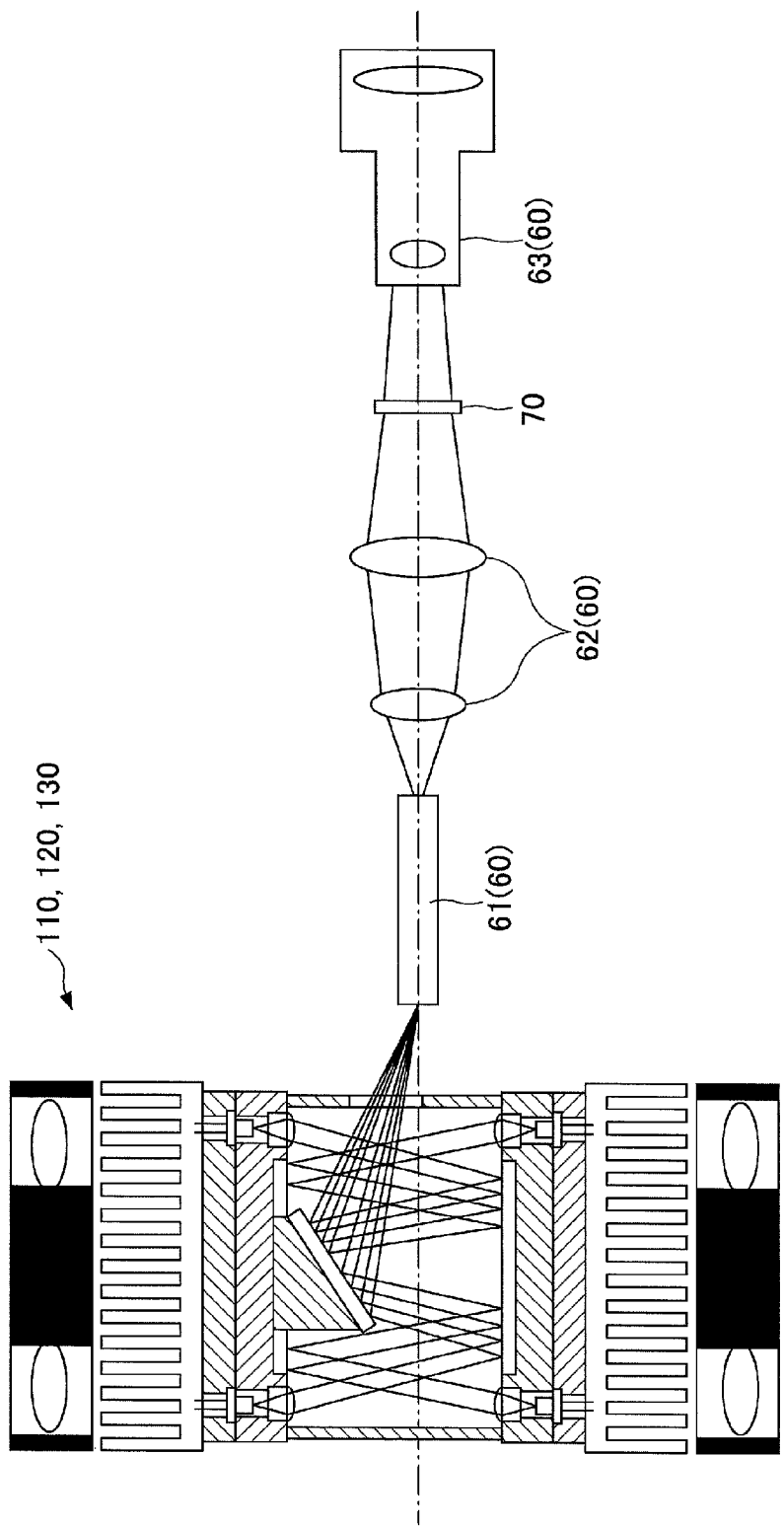
FIG. 10 is a schematic diagram for describing the image projection apparatus according to the first example of the present invention.

As illustrated in FIG. 10, the image projection apparatus 200 generates a composite light beam by compositing multiple light beams radiated from multiple light sources (e.g., light sources 21Aa-21Ap of FIG. 3) by using the illumination light generation apparatus 110, 120, or 130. In a case where the composite light is generated, the composite light is incident on the light quantity equalizing part 61 of the projection optical system 60.

The image projection apparatus 200 can generate a composite light beam having a small-sized cross section owing to the use of the illumination light generation apparatus 110, 120, or 130 for compositing multiple light beams radiated from multiple light sources. That is, the image projection apparatus 200 can generate a high density (high intensity) composite light beam by using the illumination light generation apparatus 110, 120, or 130.

Accordingly, with the image projection apparatus 200 of the first example, the incident angle of the composite light beam incident on the projection optical system 60 (more specifically, the light quantity equalizing part 61) can be reduced. Therefore, the diffusion of the light beams incident on the image forming unit 70 (more specifically, the image panel formed by the image forming unit 70) can be reduced. Further, with the image projection apparatus 200, a projection lens having a small NA (Numerical Aperture) or a large F (focal) number can be used owing to the reduction of the diffusion the light beams incident on the image forming unit 70 (more specifically, the image panel formed by the image forming unit 70). That is, the designing and manufacturing of the lens of the projection lens part 63 can be facilitated by using the image projection apparatus 200.

Then, the image projection apparatus 200 uses the light quantity equalizing part 61 to equalize the light quantities or the like of the composite light beam incident on the light quantity equalizing part 61. Then, the image projection apparatus 200 emits equalized light beams to the condenser lens part 62.

Then, the condenser lens part 62 allows the equalized light beams to transmit therethrough and further transmits the equalized light beams to the image forming unit 70 (more specifically, the image panel formed by the image forming unit 70). Then, the transmitted light beams emitted onto the image forming unit 70 are further transmitted through the image panel formed by the image forming unit 70. Then, the light beams transmitted through the image panel generate a projection light beam(s) corresponding to an image generated by the image generation part 71. Then, the image forming unit 70 emits the projection light beam to the projection lens part 63.

Then, the projection lens part 63 emits (transmits) the projection light beam(s) to a target projection object. Thereby, the image projection apparatus 200 can project an image corresponding to the image generated by the image forming unit 70 (more specifically, the image generation part 71) on a surface of the target projection object.

Hence, with the image projection apparatus 200 of the first example including one of the above-described illumination light generation apparatuses 110, 120, 130 of the first-third embodiments of the present invention, the image projection apparatus 200 can attain substantially the same effects attained by the illumination light generation apparatuses 110, 120, 130 of the first-third embodiments of the present invention.

Further, with the image projection apparatus 200 of the first example, a projection lens having a small NA (Numerical Aperture) or a large F (focal) number can be used because the incident angle of the composite beam incident on the projection optical system 60 (including the rod integrator) can be reduced. That is, the designing and manufacturing of the lens of the projection lens part 63 can be facilitated, cooling efficiency can be improved, and light usage efficiency can be improved by using the image projection apparatus 200. Further, owing to the improvement of light usage efficiency, power consumption can be reduced. Thus, a small-sized, light-weight, high intensity image projection apparatus 200 can be obtained.

Second Example

Next, an illumination apparatus 200 according to a second example of the present invention is described. The illumination apparatus 200 of the second example includes one of the above-described illumination light generation apparatuses 110, 120, 130 of the first-third embodiments of the present invention. It is to be noted that the term "illumination apparatus" includes any apparatus that radiates (emits) light to a target illumination object (i.e. an object to be illuminated).

(Configuration of Illumination Apparatus)

A configuration of the illumination apparatus 300 according to the second example is described with reference to FIG. 11. It is to be noted that, because one of the above-described illumination light generation apparatuses 110, 120, 130 of the first-third embodiments of the present invention is included in the configuration of the illumination apparatus 300, parts/units different from those described in the first-third embodiments are mainly described below.

As illustrated in FIG. 11, the illumination apparatus 300 includes one of the above-described illumination light generation apparatuses 110, 120, 130 of the first-third embodiments of the present invention. Further, the illumination apparatus 300 includes a light quantity equalizing part 301 that equalizes a light quantity radiated from the illumination light generation apparatus 110, 120, or 130, and a radiation optical system 302 that radiates light beams having their light quantities equalized by the light quantity equalizing part 301 (composite light beam) to a target illumination object. Further, the illumination apparatus 300 includes a control unit 310 that controls operations/processes of each part/unit constituting the illumination apparatus 300. The illumination apparatus 300 may further include a storage unit 303 that stores data (e.g., operation status of the illumination apparatus 300, operation conditions of the illumination apparatus 300) therein, and an I/F (interface) unit 304 that performs input/output of data with respect to an external device outside of the illumination apparatus 300.

The control unit 310 instructs the parts/units constituting the illumination apparatus 300 to operate and controls operations/processes of the parts/units constituting the illumination apparatus 300. For example, the control unit 310 controls a timing of radiating multiple light beams from the light source unit 20 including the multiple light sources (radiation timing), a light intensity (luminance) of the multiple light beams radiated from the light source unit 20, and a light quantity (amount of light) of the multiple light beams radiated from the light source unit 20 by controlling the operations/processes of the illumination light generation apparatus 110, 120, or 130. Further, the control unit 310 controls a timing of emitting the composite light beam from the illumination light generation apparatus 110, 120, or 130 (emission timing), a light intensity (luminance) of the composite light beam emitted from the illumination light generation apparatus 110, 120, or 130, and a light quantity (amount of light) of the composite light beam emitted from the illumination light generation apparatus 110, 120, or 130 by controlling the operations/processes of the illumination light generation apparatus 110, 120, or 130. Further, the control unit 310 controls operations for radiating light to the target illumination object (including controlling of illuminance and light intensity) by controlling the operations/processes of the illumination optical system 302.

It is to be noted that a program (e.g., control program, application) may be stored beforehand in, for example, the storage unit 303, so that the control unit 310 can control operations of the parts/units of the illumination apparatus 300 by using the program. Further, the control unit 210 may control operations of the parts/units of the illumination apparatus 300 based on data input from an input unit (not illustrated) included in the I/F unit 304.

The light quantity equalizing part 301 equalizes the light quantities and the like (e.g., illuminance, light intensity, brightness) of the light beams constituting the composite light beam emitted from the illumination light generation apparatus 110, 120, or 130. In this embodiment, light beams having their light quantities equalized by the light quantity equalizing part 301 are incident on the radiation optical system 302. The light quantity equalizing part 301 may use, for example, a light tunnel including, for example, a rod mirror, a kaleidoscope, a light pipe, and other members that allow light to be transmitted therethrough.

The illumination optical system 302 is an optical system that illuminates the target illumination object by radiating (emitting) the equalized light beams (composite light beam) from the light quantity equalizing part 301 to the target illumination object. The radiation optical system 302 may use, for example, a relay lens, and/or an illumination lens.

The storage unit 303 is a unit that stores data pertaining to the illumination apparatus 300 such as data pertaining to operations of the illumination apparatus 300, data pertaining to the status of the illumination apparatus 300, or data pertaining to processes of the illumination apparatus 300. The storage unit 303 may use known devices such as a hard disk, a DVD, a memory, a ROM, and/or a RAM.

The I/F unit 304 is a unit that performs input/output of data (e.g., electric signals) between the illumination apparatus 300 and an external device outside the illumination apparatus 300. The I/F unit 304 may receive input of data pertaining to the light to be radiated from the external device (e.g., PC (Personal Computer)). The I/F unit 304 may also output data pertaining to the illumination apparatus 300 to the external device (e.g., PC (Personal Computer)). The I/F unit 304 may include an input part (not illustrated) to which data is input from the external device of the user. The input part may include a user interface such as an operation panel. Further, the I/F unit 304 may also include an output part for outputting data to the external device. The output part may include a display part such as a touch panel.

(Operation of Radiating a Composite Light Beam)

Next, an operation of radiating (emitting) a composite light beam to a target illumination object with the illumination apparatus 300 according to the second example is described.

First, the illumination apparatus 300 uses the illumination light generation apparatus 110, 120, or 130 to generate a composite light beam obtained by compositing multiple light beams radiated from multiple light sources (e.g., light sources 21Aa-21Ap in FIG. 3A) of the light source unit 20. The composite light beam emitted from the illumination light generation apparatus 110, 120, or 130 is incident on the light quantity equalizing part 301.

The illumination apparatus 300 can generate a composite light beam having a small-sized cross section owing to the use of the illumination light generation apparatus 110, 120, or 130 for compositing multiple light beams radiated from multiple light sources. That is, the illumination apparatus 300 can generate a high density (high intensity) composite light beam by using the illumination light generation apparatus 110, 120, or 130.

Accordingly, with the illumination apparatus 300 of the second example, the incident angle of the composite light beam incident on the light quantity equalizing part 301 can be reduced. Further, with the illumination apparatus 300, the diffusion of the composite light beam can be reduced owing to the reduction of the incident angle of the composite light beam incident on the light quantity equalizing part 301. Further, with the illumination apparatus 300, the luminance of the target illumination object radiated by the composite light beam can be improved owing to the reduction of the diffusion of the composite light beam.

Then, the illumination apparatus 300 uses the light quantity equalizing part 301 to equalize the light quantities or the like of the composite light beam incident on the light quantity equalizing part 301. Then, the illumination apparatus 300 emits equalized light beams (composite light beam) to the target illumination object by way of the illumination optical system 302.

Hence, with the illumination apparatus 300 of the second example including one of the above-described illumination light generation apparatuses 110, 120, 130 of the first-third embodiments of the present invention, the illumination apparatus 300 can attain substantially the same effects attained by the illumination light generation apparatuses 110, 120, 130 of the first-third embodiments of the present invention. Accordingly, because light usage efficiency can be improved with the illumination apparatus 300 of the second example, power consumption can be reduced. Thus, a small-sized, lightweight, high intensity illumination apparatus 300 can be obtained.

Third Example

Next, a display apparatus 400 according to a third example of the present invention is described. The display apparatus 400 of the third example includes one of the above-described illumination light generation apparatuses 110, 120, 130 of the first-third embodiments of the present invention.
(Configuration of Display Apparatus)

A configuration of the display apparatus 400 according to the third example is described with reference to FIG. 12. It is to be noted that, because one of the above-described illumination light generation apparatuses 110, 120, 130 of the first-third embodiments of the present invention is included in the configuration of the display apparatus 400, parts/units different from those described in the first-third embodiments are mainly described below.

As illustrated in FIG. 12, the display apparatus 400 includes one of the above-described illumination light generation apparatuses 110, 120, 130 of the first-third embodiments of the present invention. Further, the display apparatus 400 includes a light quantity equalizing part 401 that equalizes a light quantity radiated from the illumination light generation apparatus 110, 120, or 130, an image forming unit 402 that forms an image from the composite light beam emitted from the illumination light generation apparatus 110, 120, or 130, and a transmission optical system 403 that transmits the equalized light beams (composite light beam) from the light quantity equalizing part 401 to the image forming unit 402. Further, the display apparatus 400 includes a control unit 410 that controls operations/processes of each part/unit constituting the display apparatus 400. The display apparatus 400 may further include a storage unit 404 that stores data (e.g., operation status of the display apparatus 400, operation conditions of the display apparatus 400) therein, and an I/F (interface) unit 405 that performs input/output of data with respect to an external device outside of the display apparatus 400.

The control unit 410 instructs the parts/units constituting the display apparatus 400 to operate and controls operations/processes of the parts/units constituting the display apparatus 400. For example, the control unit 410 controls a timing of radiating multiple light beams from the light source unit 20 including the multiple light sources (radiation timing), a light intensity (luminance) of the multiple light beams radiated from the light source unit 20, and a light quantity (amount of light) of the multiple light beams radiated from the light source unit 20 by controlling the operations/processes of the illumination light generation apparatus 110, 120, or 130. Further, the control unit 410 controls a timing of emitting the composite light beam from the illumination light generation apparatus 110, 120, or 130 (emission timing), a light intensity (luminance) of the composite light beam emitted from the illumination light generation apparatus 110, 120, or 130, and a light quantity (amount of light) of the composite light beam emitted from the illumination light generation apparatus 110, 120, or 130 by controlling the operations/processes of the illumination light generation apparatus 110, 120, or 130. Further, the control unit 410 controls operations for displaying an image (including controlling of the brightness or size of the image to be displayed) by controlling the operations/processes of the image forming unit 402 and the transmission optical system 403.

It is to be noted that a program (e.g., control program, application) may be stored beforehand in, for example, the storage unit 404, so that the control unit 410 can control operations of the parts/units of the display apparatus 400 by using the program. Further, the control unit 410 may control operations of the parts/units of the display apparatus 400 based on data input from an input unit (not illustrated) included in the I/F unit 405.

The light quantity equalizing part 401 equalizes the light quantities and the like (e.g., illuminance, light intensity, brightness) of the light beams constituting the composite light beam emitted from the illumination light generation apparatus 110, 120, or 130. In this embodiment, light beams having their light quantities equalized by the light quantity equalizing part 401 are incident on the transmission optical system 403. The light quantity equalizing part 401 may use, for example, a light tunnel including, for example, a rod mirror, a kaleidoscope, a light pipe, and other members that allow light to be transmitted therethrough.

The image forming unit 402 is a unit that forms an image to be displayed. In this embodiment, the image forming unit 402 generates the image to be displayed based on data stored in the storage unit 404 (e.g., image data) and/or data input from the I/F unit 405. For example, the image forming unit 402 may be configured to display a full-color image by using image forming elements arranged in a matrix (image panel).

The transmission optical system 403 is an optical system that transmits equalized light beams (composite light beam) from the light quantity equalizing part 401 to the image forming unit 402. For example, the transmission optical system 403 may be configured to radiate the equalized light beams to an image panel of the image forming unit 402, so that the equalized light beams serve as a backlight. The transmission optical system 403 may use, for example, a relay lens.

The storage unit 404 is a unit that stores data pertaining to the display apparatus 400 such as data pertaining to operations of the display apparatus 400, data pertaining to the status of the display apparatus 400, or data pertaining to processes of the display apparatus 400. The storage unit 404 may use known devices such as a hard disk, a DVD, a memory, a ROM, and/or a RAM.

The I/F unit 405 is a unit that performs input/output of data (e.g., electric signals) between the display apparatus 400 and an external device outside the display apparatus 400. The I/F unit 405 may receive input of data pertaining to the light to be radiated from the external device (e.g., PC (Personal Computer)). The I/F unit 405 may also output data pertaining to the display apparatus 400 to the external device (e.g., PC (Personal Computer)). The I/F unit 405 may include an input part (not illustrated) to which data is input from the external device of the user. The input part may include a user interface such as an operation panel. Further, the I/F unit 405 may also include an output part for outputting data to the external device. The output part may include a display part such as a touch panel.

(Operation of Displaying an Image)

Next, an operation of displaying an image with the display apparatus 400 according to the third example is described.

First, the display apparatus 400 uses the illumination light generation apparatus 110, 120, or 130 to generate a composite light beam obtained by compositing multiple light beams radiated from multiple light sources (e.g., light sources 21Aa-21Ap in FIG. 3A) of the light source unit 20. The composite light beam emitted from the illumination light generation apparatus 110, 120, or 130 is incident on the light quantity equalizing part 401.

The display apparatus 400 can generate a composite light beam having a small-sized cross section owing to the use of the illumination light generation apparatus 110, 120, or 130 for compositing multiple light beams radiated from multiple light sources. That is, the display apparatus 400 can generate a high density (high intensity) composite light beam by using the illumination light generation apparatus 110, 120, or 130.

Accordingly, with the display apparatus 400 of the third example, the incident angle of the composite light beam incident on the light quantity equalizing part 401 can be reduced. Further, with the display apparatus 400, the diffusion of the composite light beam radiated (emitted) to the image forming unit 402 (image panel) can be reduced owing to the reduction of the incident angle of the composite light beam incident on the light quantity equalizing part 401. Further, with the display apparatus 400, the image quality of the image to be displayed can be improved owing to the reduction of the diffusion of the composite light beam radiated (emitted) to the image forming unit 402 (image panel).

Then, the display apparatus 400 uses the light quantity equalizing part 401 to equalize the light quantities or the like of the composite light beam incident on the light quantity equalizing part 401. Then, the display apparatus 400 emits equalized light beams (composite light beam) to the image forming unit 402 (image panel) by way of the transmission optical system 403. Thereby, the display apparatus 400 can display an image on the image forming unit 402 (more specifically, an image panel of the image forming unit 402) by using the composite light beam incident on the image forming unit 402.

Hence, with the display apparatus 400 of the third example including one of the above-described illumination light generation apparatuses 110, 120, 130 of the first-third embodiments of the present invention, the display apparatus 400 can attain substantially the same effects attained by the illumination light generation apparatuses 110, 120, 130 of the first-third embodiments of the present invention. Accordingly, because light usage efficiency can be improved with the display apparatus 400 of the third example, power consumption can be reduced. Thus, a small-sized, light-weight, high intensity display apparatus 400 can be obtained.

The present invention is not limited to the specifically disclosed embodiments, and variations and modifications may be made without departing from the scope of the present invention.

The present application is based on and claims benefit of priority of Japanese Priority Application Nos. 2012-180639 and 2013-120878 filed on Aug. 16, 2012, and Jun. 7, 2013, respectively, the entire contents of which are hereby incorporated herein by reference.

What is claimed is:

1. An illumination light generation apparatus comprising:
a light source unit including first and second light source groups that radiate a plurality of light beams, respectively, the first and second light source groups facing each other; and
an emission unit that emits a composite light beam in a predetermined direction and includes
a first reflection part that reflects the plurality of light beams radiated from the first light source group, and
an emission part that reflects the plurality of light beams reflected from the first reflection part and the plurality of light beams radiated from the second light source group;
wherein the emission part generates the composite light beam by reflecting the plurality of light beams radiated from the first light source group and the plurality of light beams radiated from the second light source group in the predetermined direction,
wherein the emission unit further includes a second reflection part that faces the first reflection part,
wherein the second reflection part is configured to reflect the plurality of light beams radiated from the second light source group to the first reflection part, and
wherein the first reflection part is configured to reflect the plurality of light beams reflected from the second reflection part to the emission part.

2. The illumination light generation apparatus as claimed in claim 1,
wherein the emission part includes a reflection member that reflects the plurality of light beams radiated from the first light source group and the plurality of light beams radiated from the second light source group,
wherein the reflection member is positioned in accordance with the predetermined direction and an incident angle formed by the plurality of light beams radiated from the first light source group and the plurality of light beams radiated from the second light source group with respect to the emission part.

3. The illumination light generation apparatus as claimed in claim 2, wherein the reflection member has a curved surface.

4. The illumination light generation apparatus as claimed in claim 1,
wherein each of the first and second light source groups include a plurality of light sources from which the plurality of light beams are radiated,
wherein the plurality of light sources are positioned to radiate the plurality of light beams at a predetermined angle relative to the first reflection part or the second reflection part.

5. The illumination light generation apparatus as claimed in claim 1,
wherein each of the first and second light source groups include a plurality of semiconductor laser units from which the plurality of light beams are radiated,
wherein the light source unit further includes a plurality of collimator lenses that generate parallel light beams or converged light beams by converging the plurality of light beams.

6. The illumination light generation apparatus as claimed in claim 5, wherein an optical axis of the plurality of collimator lenses is separated a predetermined distance away from a center axis of the plurality of light beams radiated from the first and second light source groups.

7. The illumination light generation apparatus as claimed in claim 1, further comprising:
   a retaining unit that retains the light source unit;
   wherein each of the first and second light source groups include a plurality of light sources from which the plurality of light beams are radiated,
   wherein the retaining unit is configured to retain the light source unit, so that the plurality of light sources are arranged in a substantially circular shape or a polygonal shape.

8. The illumination light generation apparatus as claimed in claim 7, further comprising:
   a temperature adjustment unit that delivers cooling air to the light source unit;
   wherein the retaining unit is further configured to retain the temperature adjustment unit,
   wherein the temperature adjustment unit is configured to deliver the cooling air with a substantially annular profile or a flow pattern that corresponds to the substantially circular shape or the polygonal shape of the plurality of light sources.

9. An image projection apparatus comprising:
   the illumination light generation apparatus of claim 1;
   a projection optical system that projects an image by using the composite light beam generated by the illumination light generation apparatus; and
   an image forming unit that forms the image to be projected by the projection optical system.

10. An illumination apparatus comprising:
    the illumination light generation apparatus of claim 1;
    a light quantity equalizing part that generates an equalized light beam by equalizing a light quantity of the composite light beam emitted from the illumination light generation apparatus; and
    an illumination optical system that radiates the equalized light beam to a target illumination object.

11. A display apparatus comprising:
    the illumination light generation apparatus of claim 1;
    a light quantity equalizing part that generates an equalized light beam by equalizing a light quantity of the composite light beam emitted from the illumination light generation apparatus;
    a transmission optical system that transmits the equalized light beam generated by the light quantity equalizing part; and
    an image forming unit that forms an image by using the equalized light composite light beam transmitted by the transmission optical system.

* * * * *